United States Patent
Okuda

(10) Patent No.: US 12,471,853 B2
(45) Date of Patent: Nov. 18, 2025

(54) 3D IMAGE ANALYSIS PLATFORM FOR NEUROLOGICAL CONDITIONS

(71) Applicant: THE BOARD OF REGENTS OF THE UNIVERSITY OF TEXAS SYSTEM, Austin, TX (US)

(72) Inventor: Darin T. Okuda, Dallas, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 369 days.

(21) Appl. No.: 17/905,069

(22) PCT Filed: Apr. 29, 2021

(86) PCT No.: PCT/US2021/029835
§ 371 (c)(1),
(2) Date: Aug. 26, 2022

(87) PCT Pub. No.: WO2021/222529
PCT Pub. Date: Nov. 4, 2021

(65) Prior Publication Data
US 2023/0089375 A1     Mar. 23, 2023

Related U.S. Application Data

(60) Provisional application No. 63/018,103, filed on Apr. 30, 2020.

(51) Int. Cl.
*A61B 5/00*     (2006.01)
*A61B 5/055*    (2006.01)
(Continued)

(52) U.S. Cl.
CPC .......... *A61B 5/7275* (2013.01); *A61B 5/0042* (2013.01); *A61B 5/055* (2013.01);
(Continued)

(58) Field of Classification Search
CPC ..... A61B 5/7275; A61B 5/0042; A61B 5/055; A61B 5/4064; A61B 5/407; A61B 5/4076;
(Continued)

(56) References Cited

U.S. PATENT DOCUMENTS 6,819,952 B2 * 11/2004 Pfefferbaum .......... G01R 33/56
                                                   600/407
11,589,800 B2 * 2/2023 Tseng ..................... A61B 5/055
(Continued)

FOREIGN PATENT DOCUMENTS

WO      2019165464 A1    8/2019
WO   WO-2020/069509 A1   4/2020
WO      2021222529 A1   11/2021

OTHER PUBLICATIONS

Extended European Search Report issued in EP Application No. 21795842, 14 pages, dated Mar. 5, 2024.
(Continued)

*Primary Examiner* — Molly Wilburn
(74) *Attorney, Agent, or Firm* — DLA Piper LLP US

(57) ABSTRACT

Disclosed herein are systems and methods of analyzing 3D structure of a portion of the CNS. An analytics module may be used to calculate one or more metrics the describe changes in the 3D structure of a CNS structure over time. The one or more metrics may be used to identify patterns of structural change prior to progressive symptom development. Healthcare providers may use the one or more metrics and or patterns of structural change to diagnose neurological conditions, track the progress of neurological conditions in the patient, and determine the patient's risk of progressive disease development. The 3D structure analytics techniques described herein may also be used to develop treatments and create a care delivery that is individualized for each patient.

20 Claims, 12 Drawing Sheets

(51) Int. Cl.
| | |
|---|---|
| G06T 7/00 | (2017.01) |
| G06T 7/11 | (2017.01) |
| G06T 7/38 | (2017.01) |
| G06T 7/62 | (2017.01) |
| G06T 7/64 | (2017.01) |
| G06V 10/25 | (2022.01) |

(52) U.S. Cl.
CPC ............ *A61B 5/4064* (2013.01); *A61B 5/407* (2013.01); *A61B 5/4076* (2013.01); *A61B 5/4842* (2013.01); *G06T 7/0012* (2013.01); *G06T 7/11* (2017.01); *G06T 7/38* (2017.01); *G06T 7/62* (2017.01); *G06T 7/64* (2017.01); *G06V 10/25* (2022.01); *G06T 2207/10088* (2013.01); *G06T 2207/30016* (2013.01); *G06T 2207/30096* (2013.01)

(58) Field of Classification Search
CPC ....... A61B 5/4842; G06T 7/0012; G06T 7/11; G06T 7/38; G06T 7/62; G06T 7/64; G06T 2207/10088; G06T 2207/30016; G06T 2207/30096; G06V 10/25
See application file for complete search history.

(56) References Cited

U.S. PATENT DOCUMENTS

| | | | |
|---|---|---|---|
| 11,666,219 B2 * | 6/2023 | Fox ...................... | A61B 5/0515 600/410 |
| 11,842,491 B2 * | 12/2023 | Conklin .................. | G06T 7/187 |
| 2005/0233328 A1 | 10/2005 | Berghs et al. | |
| 2011/0218253 A1 | 9/2011 | Lange et al. | |
| 2011/0313323 A1 | 12/2011 | Henderson et al. | |
| 2012/0277572 A1 | 11/2012 | Hubbard | |
| 2013/0150922 A1 | 6/2013 | Butson et al. | |
| 2017/0039708 A1 * | 2/2017 | Henry .................. | A61B 5/4041 |
| 2018/0127507 A1 | 5/2018 | Greenberg et al. | |
| 2019/0197347 A1 | 6/2019 | Okuda et al. | |
| 2019/0248885 A1 | 8/2019 | Liddelow et al. | |
| 2020/0100732 A1 | 4/2020 | Zizi et al. | |
| 2021/0041518 A1 | 2/2021 | Okuda | |
| 2021/0150671 A1 * | 5/2021 | Guo .......................... | G06T 5/60 |
| 2021/0343008 A1 | 11/2021 | Okuda et al. | |

OTHER PUBLICATIONS

Moog et al, "African Americans experience disproportionate neurodegenerative changes in the medulla and upper cervical spinal cord in early multiple sclerosis", Multiple Sclerosis and Related Disorders, vol. 45, No. 102429, 8 pages, Jul. 27, 2020.

Ganiler et al, "A subtraction pipeline for automatic detection of new appearing multiple sclerosis lesions in longitudinal studies", Diagnostic Neuroradiology, vol. 56, pp. 363-374, Mar. 4, 2014.

Tallantyre et al, "Ultra-high-field imagin distinguishes MS lesions from asymptomatic white matter lesions", Neurology, vol. 76, pp. 534-539, Feb. 8, 2011.

Thompson, A. J. et al. Diagnosis of multiple sclerosis: 2017 revisions of the McDonald criteria. Lancet Neurol. 17, 162-173 (2018).

Wardlaw, J. M., Smith, C. & Dichgans, M. Small vessel disease: mechanisms and clinical implications. Lancet Neurol. 18, 684-696 (2019).

Solomon, A. J., Naismith, R. T. & Cross, A. H. Misdiagnosis of multiple sclerosis: impact of the 2017 McDonald criteria on clinical practice. Neurology. 92, 26-33 (2019).

Sati, P. et al. The central vein sign and its clinical evaluation for the diagnosis of multiple sclerosis: a consensus statement from the North American Imaging in Multiple Sclerosis Cooperative. Nat. Rev. Neurol. 12, 714-722 (2016.

Hammond, K. E. et al. Quantitative in vivo magnetic resonance imaging of multiple sclerosis at 7 Tesla with sensitivity to iron. Ann. Neurol. 64, 707-713 (2008).

Solomon, A. J. et al. "Central vessel sign" on 3T FLAIR* MRI for the differentiation of multiple sclerosis from migraine. Ann. Clin. Transl. Neurol. 3, 82-87 (2016).

Sinnecker, T. et al. Evaluation of the central vein sign as a diagnostic imaging biomarker in multiple sclerosis. JAMA Neurol. 76, 1446-1456 (2019).

Absinta, M. et al. Identification of chronic active multiple sclerosis lesions on 3T MRI. AJNR Am. J. Neuroradiol. 39, 1233-1238 (2018).

Elliott, C. et al. Slowly expanding/evolving lesions as a magnetic resonance imaging marker of chronic active multiple sclerosis lesions. Mult. Scler. hops ://doi.org/10.1177/13524 58518 81411 7 (2018).

Frischer, J. M. et al. Clinical and pathological insights into the dynamic nature of the white matter multiple sclerosis plaque. Ann. Neurol. 78, 710-721 (2015).

Dal-Bianco, A. et al. Slow expansion of multiple sclerosis iron rim lesions: pathology and 7 T magnetic resonance imaging. Acta Neuropathol. 133, 25-42 (2017).

Absinta, M. et al. Association of chronic active multiple sclerosis lesions with disability in vivo. JAMA Neurol. 76, 1474-1483 (2019).

McFarland, H. F. et al. Using gadolinium-enhanced magnetic resonance imaging lesions to monitor disease activity in multiple sclerosis. Ann. Neurol. 32, 758-766 (1992).

Solomon, A. J. et al. The contemporary spectrum of multiple sclerosis misdiagnosis: a multicenter study. Neurology 87, 1393-1399 (2016).

Ziemssen, T. et al. Optimizing treatment success in multiple sclerosis. J. Neurol. 263, 1053-1065 (2016).

Sethi, V. et al. Slowly eroding lesions in multiple sclerosis. Mult. Scler. 23, 464-472 (2017).

Newton, B. D. et al. Three-dimensional shape and surface features distinguish multiple sclerosis lesions from nonspecific white matter disease. J. Neuroimaging 27, 613-619 (2017).

Sivakolundu, D. K. et al. Three-dimensional lesion phenotyping and physiologic characterization inform remyelination ability in multiple sclerosis. J. Neuroimaging 29, 605-614 (2019).

Dutta, R. et al. Mitochondrial dysfunction as a cause of axonal degeneration in multiple sclerosis patients. Ann. Neurol. 59, 478-489 (2006).

Trapp, B. D. & Stys, P. K. Virtual hypoxia and chronic necrosis of demyelinated axons in multiple sclerosis. Lancet Neurol. 8, 280-291 (2009).

Neuropathology Group. Medical Research Council Cognitive F and Aging S. Pathological correlates of late-onset dementia in a multicentre, community-based population in England and Wales. Neuropathology Group of the Medical Research Council Cognitive Function and Ageing Study (MRC CFAS). Lancet. 357, 169-175 (2001).

Hoogeveen, E. S. et al. MRI evaluation of the relationship between carotid artery endothelial shear stress and brain white matter lesions in migraine. J. Cereb. Blood Flow Metab. https ://doi.org/10.1177/02716 78X19 85781 0 (2019).

Fernando, M. S. et al. White matter lesions in an unselected cohort of the elderly: molecular pathology suggests origin from chronic hypoperfusion injury. Stroke 37, 1391-1398 (2006).

Van Veluw, S. J. et al. Different microvascular alterations underlie microbleeds and microinfarcts. Ann. Neurol. 86, 279-292 (2019).

Trapp, B. D. et al. Axonal transection in the lesions of multiple sclerosis. N. Engl. J. Med. 338, 278-285 (1998).

Chang, A., Tourtellotte, W. W., Rudick, R. & Trapp, B. D. Premyelinating oligodendrocytes in chronic lesions of multiple sclerosis. N. Engl. J. Med. 346, 165173 (2002).

Brown, R. B., Traylor, M., Burgess, S., Sawcer, S. & Markus, H. S. Do cerebral small vessel disease and multiple sclerosis share common mechanisms of white matter injury?. Stroke https ://doi.org/10.1161/STROK EAHA1 18023 649 (2019).

Elliott, C. et al. Chronic white matter lesion activity predicts clinical progression in primary progressive multiple sclerosis. Brain 142, 2787-2799 (2019).

(56) References Cited

OTHER PUBLICATIONS

Lebrun, C. et al. Unexpected multiple sclerosis: follow-up of 30 patients with magnetic resonance imaging and clinical conversion profile. J. Neurol. Neurosurg. Psychiatry 79, 195-198 (2008).
Okuda, D. T. et al. Incidental MRI anomalies suggestive of multiple sclerosis: the radiologically isolated syndrome. Neurology 72, 800-805 (2009).
Lebrun-Frenay, C. et al. Radiologically isolated syndrome: 10-year risk estimate of a clinical event. Ann. Neurol. https ://doi.org/10.1002/ana.25799 (2020).
Hansen, M. R. et al. Post-gadolinium 3-dimensional spatial, surface, and structural characteristics of glioblastomas differentiate pseudoprogression from true tumor progression. J. Neurooncol. 139, 731-738 (2018).
Nyul, L. G., Udupa, J. K. & Zhang, X. New variants of a method of MRI scale standardization. IEEE Trans. Med. Imaging 19, 143-150 (2000).
Caselles, V., Kimmel, R. & Sapiro, G. Geodesic active contours. Int. J. Comput. Vision 22, 61-79 (1997).
Stan Development Team. RStan: the R interface to Stan. R package version 2.19.2. https ://mc-stan.org/. (2019).
International Preliminary Report on Patentability for International Application No. PCT/US2021/029835, issued Oct. 27, 2022.
Written Opinion for International Application No. PCT/US2021/029835, mailed Sep. 8, 2021.
International Search Report for International Application No. PCT/US2021/029835, mailed Sep. 8, 2021.
International Preliminary Report on Patentability for International Application No. PCT/US2021/028898, mailed Nov. 10, 2022, 07 Pages.
International Preliminary Report on Patentability for International Application No. PCT/US2021/029835, mailed Nov. 10, 2022, 07 Pages.
International Search Report and Written Opinion for International Application No. PCT/US2021/028898, mailed Aug. 23, 2021, 08 Pages.
International Search Report and Written Opinion for International Application No. PCT/US2021/029835, mailed Sep. 8, 2021, 08 Pages.
Office Action for European Patent Application No. 21795842.0, mailed Apr. 14, 2025, 9 pages.
Reich et al., "Multiparametric magnetic resonance imaging analysis of the corticospinal tract in multiple sclerosis" NeuroImage 2007, 38, pp. 271-279.
Sivakolundu et al., "Bold signal within and around white matter lesions distinguishes multiple sclerosis and non-specific white matter disease: a three dimensional approach", J. Neural., 267(10), 2888-2896, 2020.
International Preliminary Report on Patentability for International Application No. PCT/US2020/052452, mailed Feb. 16, 2023, 6 Pages.
International Search Report and Written Opinion for International Application No. PCT/US2020/052452, mailed Jun. 22, 2022, 08 Pages.
Extended European Search Report issued in Corresponding European Application No. 21797087.0, dated Apr. 18, 2024.
Calloni et al., "Multiparametric MR imaging of Parkinsonisms at 3 tesla: Its role in the differentiation of idiopathic Parkinson's disease versus atypical Parkinsonian disorders" European Journal of Radiology 2018, 109, pp. 95-100.

\* cited by examiner

3D IMAGE ANALYSIS PLATFORM FOR NEUROLOGICAL CONDITIONS

CROSS REFERENCE TO RELATED APPLICATIONS

This application is a U.S. National Stage Application of International Application No. PCT/US2021/029835, filed Apr. 29, 2021, which claims priority to U.S. Provisional Patent Application No. 63/018,103, "3D Image Analysis Platform For Neurological Conditions", filed Apr. 30, 2020. Each of the foregoing are hereby incorporated herein by reference in their entireties.

This application is related to U.S. Provisional Patent Application No. 62/905,079 "Methods and Systems for Analyzing Brain Lesions with Longitudinal 3D MRI Data", filed Sep. 24, 2019, International Application No. PCT/US2020/052452, filed Sep. 24, 2020, and International Application No. PCT/US21/28898.

FIELD

The disclosure relates generally to diagnosing and assessing the progression of neurological conditions in patients based on analysis of three-dimensional (3D) representations of central nervous system structures.

BACKGROUND

Multiple sclerosis (MS) is an enigmatic autoimmune condition resulting in acute inflammatory attacks and neurodegeneration within the central nervous system (CNS). This condition affects nearly 1 million individuals in the U.S. The diagnosis of multiple sclerosis (MS) is based on both clinical and radiological assessments of damage disseminated in both time and space. This may include a radiological assessment of whether a requisite number of lesions in the periventricular, juxtacortical, infratentorial, and spinal cord regions have a specific character (e.g., size, shape, and morphology) and spatial distribution patterns indicative of MS. The effective application of the existing dissemination in space criteria may be hindered by the highly sensitive nature of magnetic resonance imaging (MRI) technology, the heterogeneity of lesions resulting from a variety of medical conditions, concomitant radiological features resulting from age-related changes and disease, and the lack of additional radiological characteristics beyond two-dimensional (2D) descriptions.

Currently, MS diagnosis is typically performed using 2D MRI images. The implementation of certain imaging metrics, including the use of quantitative phase imaging, has improved lesion specificity. This may highlight the presence of central vasculature within lesions and distinct peripheral rings, suggesting the presence of iron within macrophages. The use of fluid-attenuated inversion recovery (FLAIR) star sequences at 3 Tesla (T) and T2-weighted and susceptibility weighted imaging (SWI) at 7 T in larger patient groups has also been utilized to better characterize MS from non-MS lesions. However, this technique has been limited by the lack of appreciation of the central vessel in all orthogonal planes of view and the abundance of vessels intersecting lesions within the supratentorial region. Therefore, it is desirable to develop improved MS diagnostic and disease monitoring techniques that incorporate analysis of 3D representations of CNS structures.

Additionally, at times, the development of progressive neurological decline from initial symptom onset can occur. Using current state-of-the-art monitoring techniques it is difficult to identify uniformly applicable, accurate, and reliable imaging markers that predict risk for progressive disease. Therefore, it is desirable to develop improved techniques to analyzing 3D neurostructural data in order to predict risk for progressive disease development and or characterize a patient's future course for disease progression.

SUMMARY

In one aspect described herein are methods of analyzing a three-dimensional (3D) structure of a central nervous system (CNS) structure comprising: capturing, by a 3D imaging device, image data of a portion of the CNS structure of a patient at a first time point; accessing image data of the portion of the CNS structure of a patient at a second time point, wherein the second time point is after the first time point; generating, from the image data, a first 3D representation of the portion of the CNS structure at the first time point and a second 3D representation of the portion of the CNS structure at the second time point; calculating one or more metrics that describe at least one of a 3D structural property of the CNS structure at the first time point, a 3D structural property of the CNS structure at the second time point, and a change in the CNS structure between the first time point and the second time point; identifying one or more patterns of structural change and selective areas of vulnerability in the CNS structure from the one or more metrics; and determining a probability of a particular course of development for a neurological condition of the patient based on the one or more patterns of structural change.

In one aspect, the method further comprises segmenting the image data to extract a region of interest (ROI) of the CNS structure that is included in the image data; and aligning the first 3D representation and the second 3D representation using an intensity matching technique.

In one aspect, the ROI is clinically relevant and uniformly repeatable across a wide variety of different patients with degenerative neurological conditions. In one aspect, the CNS structure is a portion of at least one of a brain and a spinal cord. In one aspect the one or more metrics include at least one of a volume measurement, a surface area measurement, a displacement measurement, and a surface complexity or curvature measurement. In one aspect, the one or more metrics include a compliance metric that describes the change in a property of the CNS structure over time.

In one aspect, the method further comprises diagnosing a neurological condition or tracking the progress of the neurological condition based on at least one of the one or more metrics and the patterns of structural change.

In one aspect, determining a probability of a particular course of development for the neurological condition further comprises: comparing the one or more metrics to one or more thresholds; and determining the neurological condition is on a progressive course of development response to determining at least one metric exceeds the threshold for that metric.

In one aspect, the one or more thresholds include: a volume-based threshold that is exceeded when a change in volume of the ROI of the CNS structure exceeds a threshold volume change; an area-based threshold that is exceeded when a change in a surface area of the ROI of the CNS structure exceeds a threshold surface area change; and a surface complexity threshold that is exceeded when a change in the surface complexity of the ROI of the CNS structure exceeds a threshold surface complexity change. In one aspect, the value of at least one of the volume-based threshold, the area-based threshold, and the surface complexity threshold is specific to a race and ethnicity of the patient.

In one aspect, disclosed herein are systems for analyzing the three-dimensional (3D) structure of a central nervous system (CNS) structure comprising: a 3D imaging device configured to capture image data of a portion of the CNS structure of a patient at a first time point; and an analytics module configured to cause one or more processors to perform the operations of: accessing image data of the portion of the CNS structure of a patient at a second time point, wherein the second time point is after the first time point; generating, from the image data, a first 3D representation of the portion of the CNS structure at the first time point and a second 3D representation of the portion of the CNS structure at the second time point; calculating one or more metrics that describe at least one of a 3D structural property of the CNS structure at the first time point, a 3D structural property of the CNS structure at the second time point, and a change in the CNS structure between the first time point and the second time point; identifying one or more patterns of structural change in the CNS structure form the one or more metrics; and determining a probability of a particular course of development for a neurological condition of the patient based on the one or more patterns of structural change.

In one aspect, the analytics module is further configured to cause the processor to perform the operations of: segmenting the image data to extract a region of interest (ROI) of the CNS structure that is included in the image data; and aligning the first 3D representation and the second 3D representation using an intensity matching technique.

In one aspect, the ROI is clinically relevant and uniformly repeatable across a wide variety of different patients with degenerative neurological conditions. In one aspect, the CNS structure is a portion of at least one of a brain and a spinal cord. In one aspect, the one or more metrics include at least one of a volume measurement, a surface area measurement, a displacement measurement, and a surface complexity measurement. In one aspect, the one or more metrics include a compliance metric that describes the change in a property of the CNS structure over time.

In one aspect, the analytics module is further configured to cause the processor to perform the operations of: diagnosing a neurological condition or tracking the progress of the neurological condition based on at least one of the one or more metrics and the patterns of structural change.

In one aspect, the analytics module is further configured to cause the processor to perform the determining a probability of a particular course of development for the neurological condition by: comparing the one or more metrics to one or more thresholds; and determining the neurological condition is on a progressive course of development in response to determining at least one metric exceeds the threshold for that metric.

In one aspect, the one or more thresholds include: a volume-based threshold that is exceeded when a change in volume of a region of the CNS structure exceeds a threshold volume change; an area-based threshold that is exceeded when a change in a surface area of a region of the CNS structure exceeds a threshold surface area change; and a surface complexity threshold that is exceeded when a change in the surface complexity of a region of the CNS structure exceeds a threshold surface complexity change. In one aspect, the value of at least one of the volume-based threshold, the area-based threshold, and the surface complexity threshold is specific to a race of the patient.

BRIEF DESCRIPTION OF THE FIGURES

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF SEVERAL EMBODIMENTS

Figure 1:
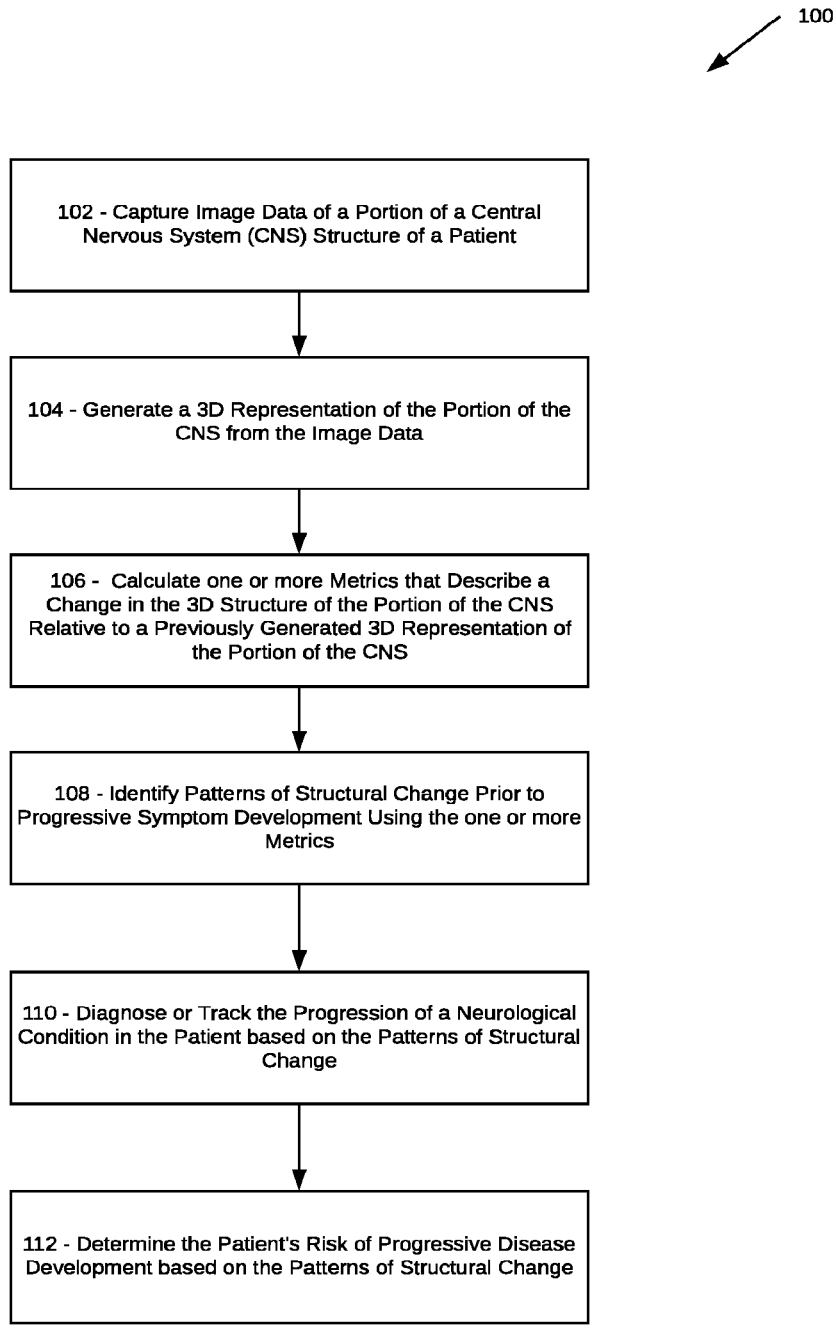
FIG. 1 illustrates an exemplary method for analyzing structural neuroimaging data according to various embodiments of the present disclosure.

Seminal investigations have revealed an inverse correlation between cervical spinal area and neurological impairment. Studies have also observed differences in cervical spinal cord volume between MS clinical phenotypes and that atrophy may be independent of focal lesions. In addition to global measures of change, the integrity of cervical grey matter may also be linked to disability. Although much progress has been made on characteristics indicative of disease progression, current imaging and analytic methods still lack the ability to accurately determine a patient's risk for progressive disease development.

The current state of the art indicator for identifying the onset of a progressive disease state is a reduction in spinal cord area. The changes in a patient's spinal cord area are typically determined by 2-dimensional (2D) approaches focused on manual cross-sectional area measures from mid-sagittal T2-weighted images from C2-C7 and registration-based methods that evaluate temporal profile changes. Despite compelling evidence of the importance of this imaging measure, outcomes from randomized studies have been unremarkable and the successful incorporation of reduced spinal cord area into later phase clinical trials has not occurred. Failure to evaluate the predictive ability of this metric in clinical settings may be due to a variety of factors including the impact of race and ethnic differences to technical challenges related to the use of various MRI scanners coupled with measures based on 2-dimensional, forced perspective, views.

The implementation of 3D conformational techniques, involving the study of 3D shape and surface features of CNS structures, has recently been shown to improve disease classification. The approach also allows for a more comprehensive assessment of both cross-sectional and longitudinal changes in volume, surface area, shape, and texture. These topographical details and precise changes in volume, surface area, and structure are not visually obvious to the human eye or through the use of techniques focused on the post-processing of 2D images. Measures of change in CNS structures are also more accurate when calculated using 3D neuroimaging data compared to calculations based on individual 2D slices that are combined to reconstruct the 3D form of the CNS structure. By removing the reconstruction step included in methods that rely on 2D image data, the analytical techniques described herein are able to calculate changes in CNS structures more efficiently and using less processing and memory resources.

The systems and methods described herein calculate and compare the temporal changes in the 3D structure of CNS structures to identify patterns of structural change that may explain the more aggressive disease course. For example, Example 1 describes an exemplary analysis of the 3D structure of the medulla-upper cervical spinal cord in AA and white MS patients to identify visual metrics that may indicate a patient's risk of progressive disease development. Other conditions the analytical techniques described herein may be used to diagnose, track progress of, determine response to treatment, and or predict course of disease development include, for example, neuromyelitis optica spectrum disorder, anti-MOG antibody syndrome, cancer, stroke, substance abuse, Alzheimer's Disease, sleep disorders, traumatic brain injury, cerebellar disorders, mitochondrial diseases, genetic disorders, movement disorders (i.e. Parkinson's Disease, multiple system atrophy, etc.), and other neurodegenerative conditions of the central nervous system.

Figure 2:
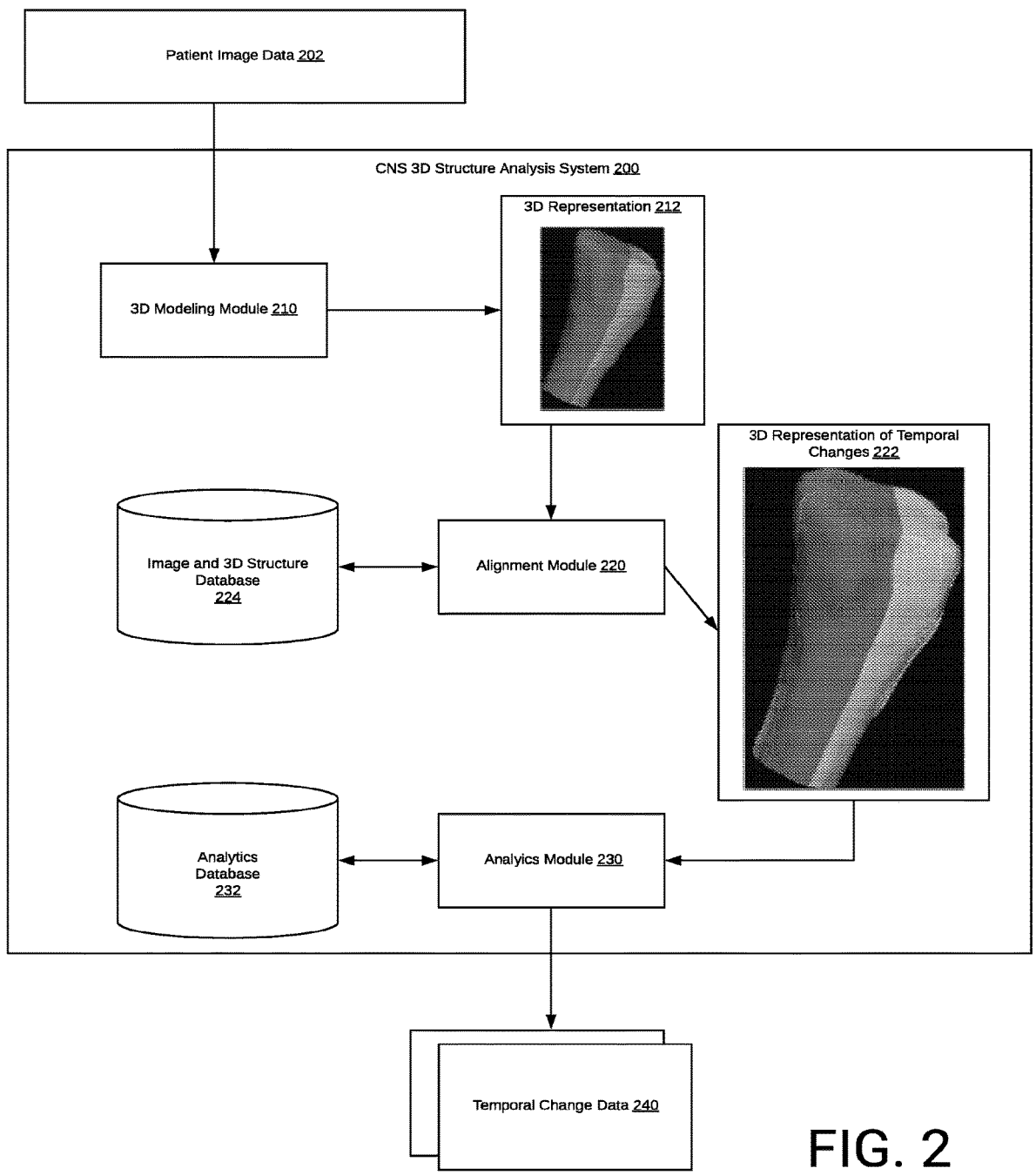
FIG. 2 is a block diagram illustrating an exemplary CNS 3D structure analysis system according to various embodiments of the present disclosure.

FIG. 1 is a flow chart illustrating an exemplary method 100 for analyzing 3D structural neuroimaging data. As shown, the method 100 may be used to identify patterns of structural change in one or more CNS structures. The presence of one or more of these patterns in 3D neuroimaging data may be used to determine the patient's risk of having a particular disease course of development, for example, a progressive MS development or other aggressive disease course. FIG. 2 illustrates an exemplary CNS 3D structure analysis system 200 configured to perform the method 100 for analyzing 3D structural neuroimaging data. While some of the aspects of the method 100 are described with reference to the system 200, the system 200 is not limiting on the method 100, which can be performed with any suitable system.

As shown in FIGS. 1 and 2, the process of identifying early patterns of structural change indicative of progression of MS or another neurological condition, may begin by capturing image data of a portion of the CNS of a patient. For example, a particular region of interest of the brain (e.g., a brain lesion), spinal cord (e.g., medulla-upper cervical spinal cord), or other portion of the CNS. Image data 202 captured during one or more imaging sessions may be analyzed by the method 100. For example, image data 202 captured at a first time may be compared to image data 202 captured at a second time to calculate the temporal changes in the structure of a region of interest. For example, image data 202 captured at the first time and the image data 202 captured at the second time can each be one or more 3D MRI images of the spinal cord or other CNS structure captured by a 3D MRI scanner. Any suitable time can be elapsed between the first and second times; for example, the time elapsed between the first and second times can be greater than or equal to any one of, or between any two of, 3 months, 4 months, 5 months, 6 months, 1 year, 2 years, 3 years, or 4 years (e.g., between 6 months and 4 years).

Image data 202 may be captured using 3D MRI or another other 3D imaging technique. For example, image data may be captured using a 3T MRI scanner (Philips Medical Systems, Cleveland, Ohio) using a 32-channel phased array coil for reception and body coil for transmission. Each MRI study may include scout localizers to identify relative anatomical positions of captured images. The MRI studies may also use any set of configurations for the MRI scanner. For example, the MRI scanner may use 3D high-resolution inversion recovery spoiled gradient—echo T1-weighted isotropic (1.1×1.1×1.1 mm3, TE/TR/TI=3.7/8.1/864 ms, flip angle 12 degrees, 256×220×170 mm3 FOV, number of excitations (NEX)=1, 170 slices, duration: 4:11 min), 3D fluid-attenuated inversion recovery (FLAIR) (1.1×1.1×1.1 mm3, TE/TR/TI=350/4800/1600 ms, flip angle 90 degrees, 250×250×180 mm3 FOV, NEX=1, 163 slices, duration: 5:02 min) and or 3D T2-weighted sequence acquired in sagittal plane (1.0×1.0×1.0 mm3, TE/TR/TI=229/2500/1600 ms, flip angle 90 degrees, 250×250×180 mm3 FOV, NEX=1, 164 slices, duration: 4:33 min).

Once the image data is captured, a 3D representation 212 of the CNS structure may be generated by a 3D modeling module 210 of the CNS 3D structure analysis system 200 at 104. To generate 3D representations 212 of the structure at each time, from image data 202, the CNS 3D structure analysis system 200 may include one or more processors configured to receive each of the 3D images included in the image data 202 from the MRI study. The processors may then segment 3D MRI image into one or more regions of interest (ROIs) that can each correspond to one of the one or more lesion(s) or other areas of structural change in the spinal cord and or brain. To perform segmentation, the MRI studies may be initially registered based on structural positioning and intensity using a proprietary software package, Med-IP. For example, images from the MRI studies may be aligned using a modified version of Insight Tool Kit (ITK) multi-resolution rigid registration with Mattes Mutual Information Metric. Intensity alignment may be performed locally around the medulla and spinal cord across two or more MRI time points through histogram matching. The histogram matching technique may utilize a set of linear transforms computed from ordered correspondence on a set of match points from the quantiles of each histogram of the local region around the brainstem and spinal cord, ensuring local consistency across MRI time points for each lesion. It is understood that other methods known in the art may be used to align image data and or 3D representations generated from image data.

To facilitate segmentation, before the MRI device images the patient's brain, a contrast agent (e.g., a paramagnetic agent such as a gadolinium-based contrast agent, an agent including a dye/pigment, and/or the like) can be administered to the patient such that the contrast agent enters the patient's bloodstream and travels to the brain. Because the blood-brain barrier at brain lesions may be compromised, a higher concentration of the contrast agent may be present at the lesion(s) or other areas of structural change compared to other regions in the brain, spinal cord or other CNS structure. By using a contrast agent, lesions and other areas of structural change may exhibit higher intensities in the image and thereby may be readily identified as regions of interest (ROIs). In other embodiments, however, the 3D representations can be obtained from non-contrast imaging techniques.

For example, to obtain 3D representations of the medulla-upper cervical spinal cord section used in Example 1 below, image data was segmented into a region of interest measuring 25 mm from the medulla to the caudal region of the C2 (medulla-upper cervical spinal cord) level. Non-contrast enhanced 3D isotropic T1-weighted sequences were used for segmentation. The sequences may be performed by proprietary and or third-party software, for example, Materialise Mimics (version 22.0; Materialise NV, Leuven, Belgium) and image masks were generated from both MRI time points. This region of interest was strategically selected due to consistent anatomical boundaries amongst patients and the lack of impact on this structure with varying head positions. Materialise 3-matic (version 14.0; Materialise NV, Leuven, Belgium) or other third party or proprietary software may be used to enhance the segmented isolated regions of interest. Med-IP, an in-house developed software platform may then be used for the quantitative data analysis acquired from re-registered image files.

Once the images are segmented into one or more ROIs, the ROIs captured for the first time and the second time may then be aligned. For example, the ROIs may be aligned using a proprietary and other third-party software package, for example, Insight Tool Kit (ITK) multi-resolution rigid registration with Mattes Mutual Information Metric. To ensure proper intensity alignment, histogram matching was performed for intensities included in regions of interest using linear transforms and ordered correspondence. For example ordered correspondence computations performed on a set of match points computed from the quantiles of each histogram.

Each 3D representations of a CNS structure can be data that represents the geometry of the structure (e.g., from which the volume, surface area, and/or other geometric characteristics can be calculated). For example, the 3D representations may be orthographic projection of the 3D representations for the first time and the second time superimposed on one another. The 3D representations for the first time and the second time can each represent the structure as a polyhedron whose surface is defined by a plurality of polygons (e.g., triangles) and include data regarding the position of the polygons' vertices in 3D coordinates (e.g., 3D Cartesian coordinates) and/or the polygons' unit normals. The 3D representations may be imported as a stereolithography (.stl) file representing the surface geometry of the lesion at the first and second times, respectively. In other embodiments, however, the first and second 3D representations can include any suitable data representing the geometry of the lesion.

Figure 3:
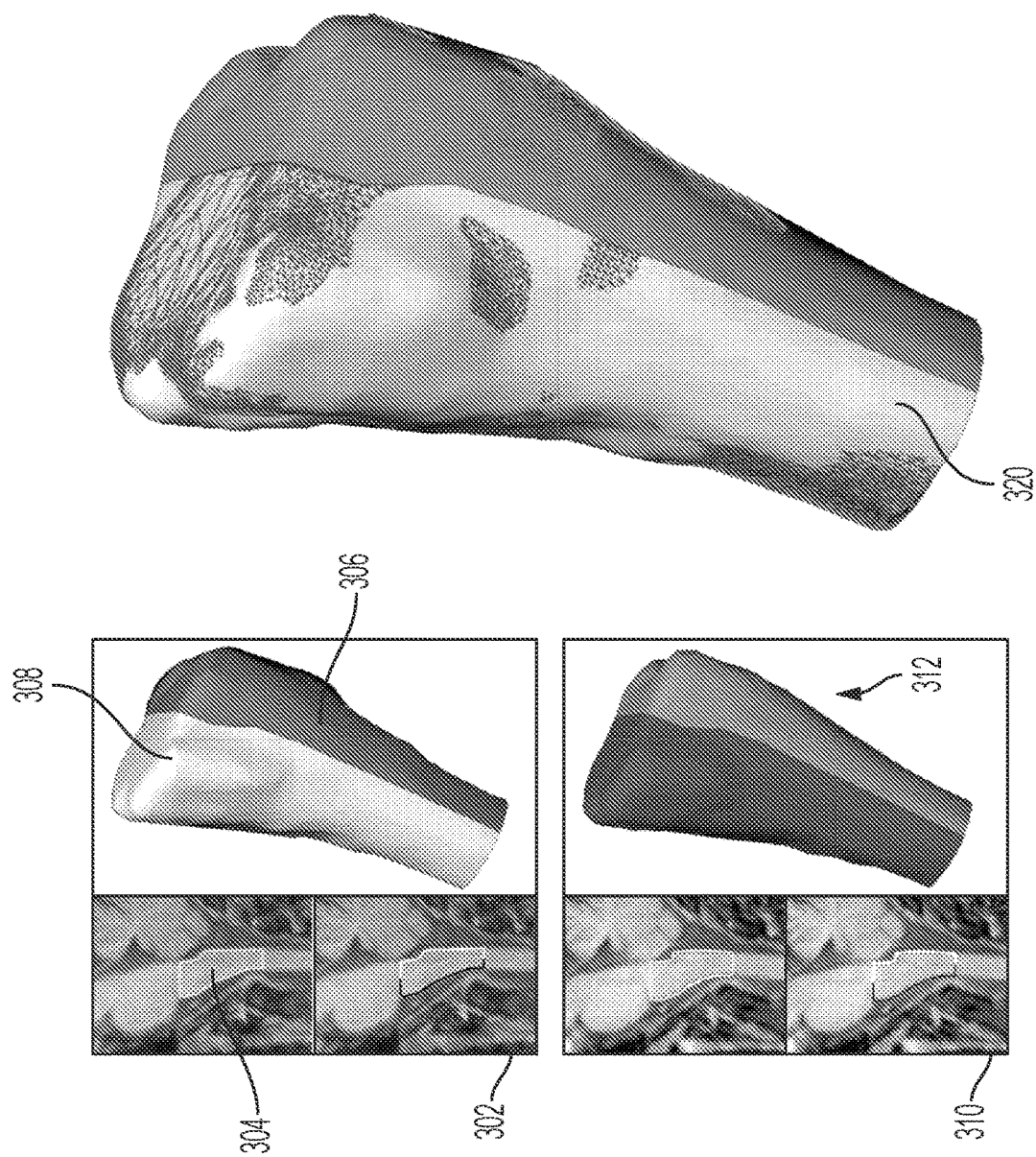
FIG. 3 illustrates an exemplary 3D visual model illustrating temporal changes in an CNS structure according to various embodiments of the present disclosure.

For example, as shown in FIG. 3, the 3D representations may be a 3D model illustrating the CNS structure at a particular time. The 3D representation may also be a simulation model or other combined model that shows the temporal changes in the CNS structure from the first time to the second time.

Once, the 3D representations are generated, the 3D representations may be recorded in memory and or stored in an image and 3D structure database 224. The alignment module 220, analytics module 230 and or other component of the CNS 3D structure analysis system 200 may access 3D representations 212 and or image data 202 from the image and 3D structure database 224. For example, the alignment module 220 may access a 3D representation from a previous time point to generate a 3D representation of temporal changes 222 that displays the 3D representation from the previous time point over the 3D representation of the current time point 212.

The analytics module 230 may access image data 202 and one or more 3D representations from the image and 3D structure database 224 as well as one or more 3D representations of temporal changes 222 to calculate one or more metrics describing the CNS structure at the second time point relative to the CNS structure at the first time point and or vice versa at 106. The one or more metrics may also include characteristics of the CNS structure and/or regions of interest at one time point. For example, the one or more metrics may include rate of change in total volume, change in total surface area, ventral compliance rate, total compliance rate, ventral 3D surface volume reduction rate, dorsal 3D surface volume reduction rate, total 3D surface reduction rate, dorsal surface complexity at $t_1$, dorsal surface complexity at $t_2$, rate of change in dorsal surface complexity, ventral surface complexity at $t_1$, ventral surface complexity at $t_2$, rate of change in ventral surface complexity, and the like. The metrics may be included in temporal change data 240 and may be used to derive one or more patterns of structural change at block 108.

In examples where the 3D representations each represent the CNS structure as a polyhedron whose surface is defined by a plurality of triangles (e.g., when each is a stereolithography file), the total volume for the CNS structure and or one or more ROIs can be calculated by (1) for each of the triangles, calculating the signed volume of a tetrahedron having a base defined by the triangle and a vertex at the origin and (2) summing the signed volumes to determine the total volume, and the surface area can be calculated by summing the areas of the triangles. The change in the volume and the surface area can be determined by subtracting, respectively, the volume and the surface area calculated from the first 3D representation from the volume and the surface area calculated from the second 3D representation. The change in the position of a lesion or other area of structural change can be calculated as the change in the position of the lesion's centroid from the first time to the second time (e.g., from the first and second 3D representations, respectively) and the displacement of the lesion or other area of structural change can be calculated as the magnitude of the resulting vector.

In Example 1 below, total volume and surface area measurements were acquired from the total medulla-upper cervical spinal cord selection shown in FIG. 3 based on centroid measures. The volume and surface area of the ventral and dorsal regions were also calculated based on centroid measures. The ventral and dorsal regions were segmented from the total medulla-upper cervical spinal cord selection through a vertical dissection. The volume and surface area values for the total selection and the dorsal and ventral regions were calculated at the first and second MRI time points. Additionally, the rates of change over time form each of these values was also calculated.

To measure the temporal change in CNS structures between a first image data capture session at a first time and a second image data capture session at a second time, the analytics module 230 may determine a compliance metric. For example, as described below in Example 1, to determine if structural changes within the medulla-upper cervical spinal cord occurred between MRI time points, measures assessing for differences were determined using an in-house developed computational method. To determine compliance, defined as the degree of change in 3D volume between MRI time points, the distance was determined from each polygon in of the 3D representation generated from registered images captured at MRI time point 1 to the corresponding outer or inner surface polygon of the 3D representation at MRI time point 2. The array of data is then used to determine the volume of change between imaging time points. To determine the volume of change, the sum of the polygon areas is calculated and then multiplied by the distance to the outer polygon for positive volume changes. To measure a surface volume reduction, the inverse value (i.e., the sum of the polygon areas multiplied by the distance to the inner polygon) is calculated to determine the degree of volume reduction between MRI time points.

Another metric determined by the analytics module 230 is surface complexity. Surface complexity may be computed by selecting an ROI that stays uniform across all image data capture time points. For example, in Example 1 below, the ROI is an 8 mm×6.25 mm×9 mm region at the ventral and dorsal aspects of the medullar-upper cervical spinal cord that stays uniform across time points for each group. Surface complexity from all 6 sides within this ROI was then analyzed for both the dorsal and ventral regions of the spinal cord, measuring both external and internal characteristics from the defined ROI. Surface complexity may include, for example, a maximum curvature analysis, a mean curvature analysis, and a change in curvature within the ROI. Within the specified region, the maximum curvature analysis provides the local maximum curvature for each triangle in the 3D representation. By assigning a curvature value to each triangle in the ROI of the 3D representation, the mean value for the curvature in the ROI may then be determined by averaging all of the curvature values included in the ROI. The mean value for the curvature in the ROI of the 3D representation at each imaging time point may then be compared to determine the change in surface complexity over time. Zero represents the baseline for determining the degree of change between time points. Negative mean values indicate a more concave surface and positive mean values reflecting more convex features.

At 108, the analytics module 230 may also perform one or more statistical analyses on the 3D transformations described above to determine if the metrics are statistically significant and otherwise identify patterns of structural change that may indicate a particular disease course. In Example 1, described below, each 3D metric was analyzed using independent regression models including: 1) age at initial scan, 2) if the subject was diagnosed with MS versus healthy control, 3) if the subject was an AA patient diagnosed with MS versus not, 4) if the patient was female versus male, and 5) time from symptom onset until the initial scan. Regarding time from symptom onset until the initial scan, this variable was set to zero for healthy controls. Due to evidence against the normality assumption and/or the homogeneity of variance assumption of linear regression, transformations were made to various variables including log transformations, square root transformations, squared transformations, and rank transformation. The transformations made to each measurement are shown in table 1 below. The statistical transformations shown below were performed to normalize the raw data obtained prior to the statistical analysis. Normalizing the raw data using these transformations allowed for a more accurate determination of significant differences between groups.

TABLE 1

| Measurement | Transformation | Variable Declarations |
|---|---|---|
| Rate of Change in Total Volume | $\mathrm{rank}\left\{\dfrac{TV_2 - TV_1}{d}\right\}$ | $TV_1$: total volume at $t_1$; $TV_2$: total volume at $t_2$; d: duration between $t_1$ and $t_2$. |
| Change in Total Surface Area | $\sqrt{\mathrm{rank}\left\{\dfrac{TSA_2 - TSA_1}{d}\right\}}$ | $TSA_1$: total surface area at $t_1$; $TSA_2$: total surface area at $t_2$; d: duration between $t_1$ and $t_2$; |
| Ventral Compliance Rate | $\mathrm{rank}\left\{\dfrac{\text{Ventral Growth}}{d}\right\}$ | d: duration between $t_1$ and $t_2$. |
| Dorsal Compliance Rate | $\mathrm{rank}\left\{\dfrac{\text{Dorsal Growth}}{d}\right\}$ | d: duration between $t_1$ and $t_2$. |
| Total Compliance Rate | $\mathrm{rank}\left\{\dfrac{\text{Total Growth}}{d}\right\}$ | d: duration between $t_1$ and $t_2$. |
| Ventral 3D Surface Volume Reduction Rate | $\left[\mathrm{rank}\left\{\dfrac{\text{Ventral Growth}}{d}\right\}\right]^2$ | d: duration between $t_1$ and $t_2$. |
| Dorsal 3D Surface Volume Reduction Rate | $\left[\mathrm{rank}\left\{\dfrac{\text{Dorsal Shrinkage}}{d}\right\}\right]^2$ | d: duration between $t_1$ and $t_2$. |
| Total 3D Surface Reduction Rate | $\left[\mathrm{rank}\left\{\dfrac{\text{Total Shrinkage}}{d}\right\}\right]^2$ | d: duration between $t_1$ and $t_2$. |

TABLE 1-continued

| Measurement | Transformation | Variable Declarations |
|---|---|---|
| Dorsal Surface Complexity at $t_1$ | $\text{rank}\{(DSC_1)^2\}$ | $DSC_1$: Dorsal surface complexity at $t_1$ |
| Dorsal Surface Complexity at $t_2$ | $\text{rank}\{(DSC_2)^2\}$ | $DSC_2$: Dorsal surface complexity at $t_2$ |
| Rate of Change in Dorsal Surface Complexity | $\text{rank}\left\{\dfrac{DSC_2 - DSC_1}{d}\right\}$ | $DSC_1$: Dorsal surface complexity at $t_1$; $DSC_2$: Dorsal surface complexity at $t_2$; d: duration between $t_1$ and $t_2$. |
| Ventral Surface Complexity at $t_1$ | $\text{rank}\{VSC_1\}$ | $VSC_1$: Ventral surface duration between $t_1$ and $t_2$. complexity at $t_1$ |
| Ventral Surface Complexity at $t_2$ | $\text{rank}\{VSC_2\}$ | $VSC_2$: Ventral surface complexity at $t_2$ |
| Rate of Change in Ventral Surface Complexity | $\text{rank}\left\{\dfrac{VSC_2 - VSC_1}{d}\right\}$ | $VSC_1$: Ventral surface complexity at $t_1$ complexity at $t_1$; $VSC_2$: Ventral surface complexity at $t_2$; d: duration between $t_1$ and $t_2$. |

$t_1$: time of initial scan;
$t_2$: time of second scan

At 110, the one or more metrics may be used to characterize whether the patient has a neurological condition such as multiple sclerosis, the progression of the patient's condition, and or likelihood the patient's condition will follow a particular course of progression. To make one or more of these determinations, whether the patient's image data satisfies one or more criteria about the 3D structure of the CNS structures captured in the image data may be evaluated. For example, the one or more criteria can include (1) a volume-based criterion that can be satisfied when the calculated change in the total volume and or the volume of an ROI is less than or equal to a threshold volume change, (2) an area-based criterion that can be satisfied when the calculated change in the total surface area and or the surface area of an ROI is less than or equal to a threshold surface area change, (3) a displacement-based criterion that can be satisfied when the calculated displacement of a ROI is greater than or equal to a threshold displacement, and or (4) a deformation-based criterion that can be satisfied when the theoretical radius ratio of the ROI, surface complexity of the ROI, or other measure of deformation is greater than or equal to a threshold value for that measure of deformation for at least one of, the time periods during which image data for the patient was captured. The analytics module 230 may be configured to perform the assessment of the one or more criteria and/or characterize the presence, progression, and or risk of a particular disease course in the patient.

Satisfaction of the one or more criteria can indicate that the patient has particular condition, that condition is progressing in the patient, and or the patient's condition is likely to follow a particular course of development. The one or more criteria may depend on a characteristic of the patient including age, race, treatment history, and the like. One exemplary criteria for tracking MS may be include a slower volume and surface area change for brain lesions. In patients having MS brain lesions may tend to have a slower growth in volume and in surface area (and may even have a volume and a surface area that decrease with time) compared to those in patients having NSWMD, and thus a lesion having a change in volume and/or surface area that is lower than a threshold volume change and threshold surface area change, respectively, may be indicative of the presence and/or progression of MS. Brain lesions in patients having MS may also experience greater displacements compared to those in patients having NSWMD, and thus a lesion having a displacement over time that is greater than a threshold displacement may also be indicative of the presence and/or progression of MS. While the theoretical radius ratio of both MS lesions and NSWMD lesions may tend to remain substantially the same over time, NSWMD lesions may tend to be more spherical than MS lesions and, as such, a lesion having a theoretical radius ratio above a threshold radius ratio at each of the first and second times may also be indicative of the presence and/or progression of MS.

EXAMPLES

Aspects of the present invention will be described in greater detail by way of a specific example. The following examples are offered for illustrative purposes only and are not intended to limit the disclosure in any manner. Those of skill in the art will readily recognize a variety of noncritical parameters that can be changed or modified to yield essentially the same results.

Example 1

To compare the temporal changes in the 3-dimensional (3D) structure of the medulla-upper cervical spinal cord region in African American (AA) and white MS patients to identify early patterns of structural change prior to progressive symptom development. Recruited patients were placed into three groups: i) AA patients with a confirmed diagnosis of MS based on established criteria, results from supporting para-clinical studies (i.e. cerebrospinal fluid profiles, electrophysiological data, serological results), and the exclusion of other disease states and ii) white patients with a confirmed diagnosis of MS based on established criteria, results from supporting para-clinical studies (i.e. cerebrospinal fluid profiles, electrophysiological data, serological results), and the exclusion of other disease states and iii) healthy control subjects with no history of brain anomalies typical for CNS demyelination based on the observed radiological phenotype and formal imaging interpretations by board certified neuroradiologists and clinical impressions by specialists in MS.

The study cohort was comprised of 35 individuals, 30 patients with an established diagnosis of MS and 5 healthy control subjects. Of the 30 MS patients, 10 were AA (8 female; median age=33.8 years (y), interquartile range [10.9] with a median disease duration of 11.8 y [11.3] and 20 were white (10 female; median age=35.6y [17.4]) having a median disease duration of 7.23 y [8.83]. EDSS scores were 0.0 within the MS cohort. Five healthy controls (2 female) were also included having a median age of 51.8y [10.2]. The baseline demographic information, clinical characteristics of the groups studied, and medulla-upper cervical spinal cord data by group are summarized below within Table 2.

The same section of each patient's medulla-upper cervical spinal cord was imaged using a 3D MRI at two time points as described above. Using the image data captured in the MRI studies, 3D representations of the medulla-upper cervical spinal cord were generated at each time point. The 3D representations were then aligned to form a combined model and one or more metrics were calculated from the 3D structural data included in the 3D representations to identify patterns of structural change. FIG. 3 illustrates an exemplary medulla-upper cervical spinal cord ROI 304 segmented from a set of image data captured at a first time point 302 and a set of image data captured at a second time point 310. FIG. 3 also illustrates a 3D representation of the medulla-upper cervical spinal cord 312 at each time point. As shown, the 3D representation of the medulla-upper cervical spinal cord 312 is divided into a ventral region 308 and a dorsal region 306. An exemplary combined model 320 is also shown in FIG. 3. As shown, the combined model 320 displays the ventral region 308 of the 3D representation at the first time point 302 under the ventral region of the 3D representation at the second time point and the dorsal region 306 at the first time point 302 shown over the dorsal region at the second time point.

Median measurements for each metric and temporal change metric calculated using the 3D structural data for each patient are summarized in Table 2 below.

TABLE 2

|  | Multiple Sclerosis Subjects | | | Hypothesis Tests | |
| --- | --- | --- | --- | --- | --- |
|  | African American (I) | Caucasian (II) | Healthy Control (III) | I vs. II | II vs. III |
| n | 10 | 20 | 5 |  |  |
| Age | 33.8 (10.86) | 35.6 (17.39) | 51.8 (10.23) |  |  |
| Sex | Female (8) | Female (10) | Female (2) |  |  |
| Time to Initial Treatment | 0.08 (1.3), n = 9 | 0 (1.76), n = 19 | — |  |  |
| Time between Scans | 0.99 (0.74) | 1.8 (1.52) | 1.11 (1.27) |  |  |
| Expanded Disability Status Scale (EDSS Score) | 0.0 (0.0-0.0) | 0.0 (0.0-0.0) | — |  |  |
| Total Volume at $t_1$ (mm3) | 4164.11 (976.51) | 4236.78 (605.7) | 4214.5 (251.94) | 0.376 | 0.554 |
| Total Volume at $t_2$ | 4015.58 (711.4) | 4597.46 (579.63) | 4750.75 (192.36) | 0.058 | 0.543 |
| Rate of Change in Total Volume | −180.52 (261.26) | 219.08 (155.98) | 461.19 (69.13) | <0.0001 | 0.088 |
| Total Surface Area at $t_1$ | 1215.66 (124.15) | 1230.99 (97.17) | 1219.22 (49.73) | 0.323 | 0.742 |
| Total Surface Area at $t_2$ | 1191.36 (101.16) | 1283.48 (94.47) | 1289.79 (18.24) | 0.176 | 0.602 |
| Change in Total Surface Area | −21.04 (23.67) | 31.85 (20.85) | 53.39 (11.7) | <0.0001 | 0.233 |
| Ventral Surface Area | 607.81 (68.82) | 615.19 (55.94) | 620.05 (39.9) | 0.231 | 0.995 |
| Ventral Volume | 2056.27 (418.21) | 2187.13 (391.85) | 2164.89 (118.89) | 0.740 | 0.460 |
| Dorsal Surface Area | 606.85 (59.21) | 609.68 (42.18) | 605.08 (7.27) | 0.432 | 0.570 |
| Dorsal Volume | 2107.84 (434.51) | 2061.67 (289.76) | 2049.62 (62.5) | 0.163 | 0.674 |
| Ventral Compliance Rate | 20.47 (28.54) | 88.3 (109.77) | 202.89 (68.57) | 0.002 | 0.235 |
| Dorsal Compliance Rate | 25.47 (12.57) | 97.46 (104.11) | 207.15 (62.01) | 0.0005 | 0.028 |
| Total Compliance Rate | 52.34 (32.57) | 231.13 (155.78) | 470.56 (70.06) | 0.0008 | 0.086 |
| Ventral Atrophy Rate | 126.81 (124.97) | 5.63 (12.98) | 2.92 (5.63) | <0.0001 | 0.576 |
| Dorsal Atrophy Rate | 99.09 (59.07) | 7.57 (7.36) | 3.03 (2.11) | <0.0001 | 0.028 |
| Total 3D Surface Volume Reduction Rate | 244.36 (203.04) | 16.14 (12.65) | 5.69 (8.48) | <0.0001 | 0.109 |
| Dorsal Surface Complexity at $t_1$ | 3.58 (4.77) | −0.06 (0.43) | −0.08 (0.16) | 0.030 | 0.128 |
| Dorsal Surface Complexity at $t_2$ | −1.49 (2.39) | −0.07 (0.77) | −0.05 (0.06) | 0.047 | 0.279 |
| Rate of Change in Dorsal Surface Complexity | −3.74 (5.8) | 0 (0.02) | −0.04 (0.03) | <0.0001 | 0.401 |
| Ventral Surface Complexity at $t_1$ | 0.16 (0.04) | 0.18 (0.02) | 0.2 (0.02) | 0.082 | 0.682 |
| Ventral Surface Complexity at $t_2$ | 0.17 (0.02) | 0.17 (0.03) | 0.19 (0.04) | 0.197 | 0.793 |
| Rate of Change in Ventral Surface Complexity | 0.01 (0.06) | 0 (0.01) | 0 (0) | 0.081 | 0.165 |

$t_1$: time of initial scan;
$t_2$: time of second scan

As shown in Table 2, no significant differences were observed between MRI time points when the total volumes of the medulla and upper cervical spinal cord from AA were compared to white MS patients and when the MS cohort (AA and white MS patients) was compared to healthy controls. However, AA patients experienced a significant decrease in the rate of change in the total volume ($p<0.0001$)

between the two MRI time points. In particular, the AA patients had lower reductions in volumes along with reduced rates of change in the total surface area (p<0.0001) when compared to whites.

Figure 4:
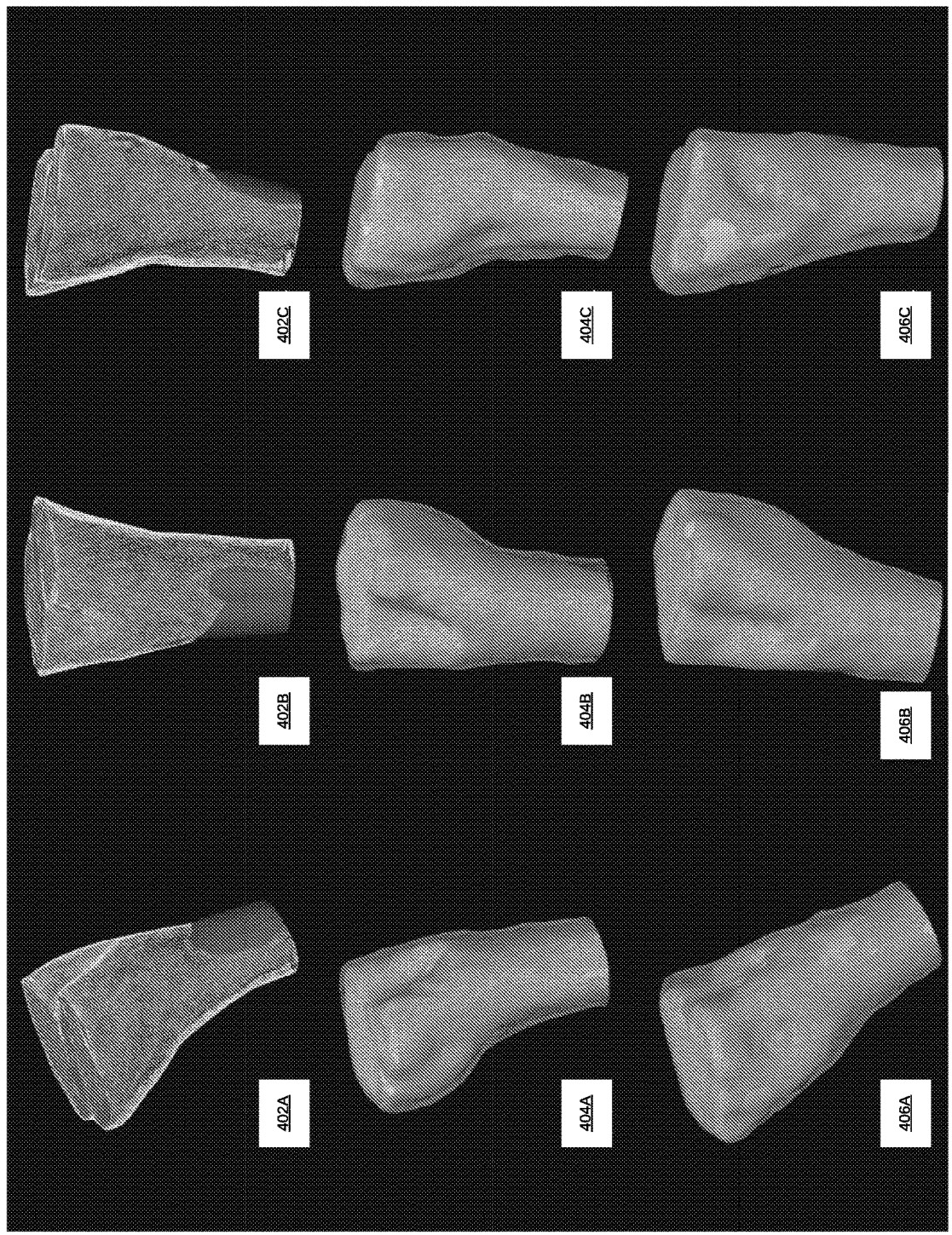
FIG. 4 illustrates an exemplary visual simulation models of the patient groups described in Example 1 according to various embodiments of the present disclosure.

The lower reductions in volumes and the reduced rate of change in total surface area for AA patients is shown in FIG. 4. FIG. 4 illustrates visual simulation models of the medulla-upper cervical spinal cord for AA patients (402A-402C), white patients (404A-404C), and healthy control patients (406A-406C). As shown, the for AA patients, time point 1 is represented by the yellow mesh and time point 2 is represented by the solid blue color. For whites and healthy patients, time point 1 is represented by the solid yellow and time point 2 by the blue mesh. The heterogenous decrease in volume from time point 1 to time point 2 is shown for the AA patients by the prevalence of yellow mesh on the outside of the solid blue interior. This indicates the volume of spinal cord is greater at time point 1 than time point 2 for AA patients (FIG. 402A-402C). On the other hand, for whites (404A-404C) and healthy patients (406A-406C), a greater amount of spinal cord volume is preserved as shown by the prevalence of blue mesh representing the spinal cord structure at time point 2 around the solid yellow color representation of the spinal cord section at time 2.

The analysis of the ventral and dorsal portion of the medulla-upper cervical spinal cord revealed no significant differences in volume and surface area measures between AA and white MS patients and when MS patients were compared to controls. However, AA patients were more likely to have lower ventral (p=0.002) and dorsal compliance (p=0.0005) rates, or 3D structural changes that were less dynamic when MRI time point 2 measures were compared to data obtained from their first MRI study, when compared to whites with MS. Additionally, AA patients demonstrated significant atrophy rates at the ventral (p<0.0001) and dorsal (p<0.0001) compartments when evaluating for transitions in size in the medulla-upper cervical spinal cord between the two MRI time points. No significant difference in the rate of change between these two compartments was observed by study group.

Figure 5:
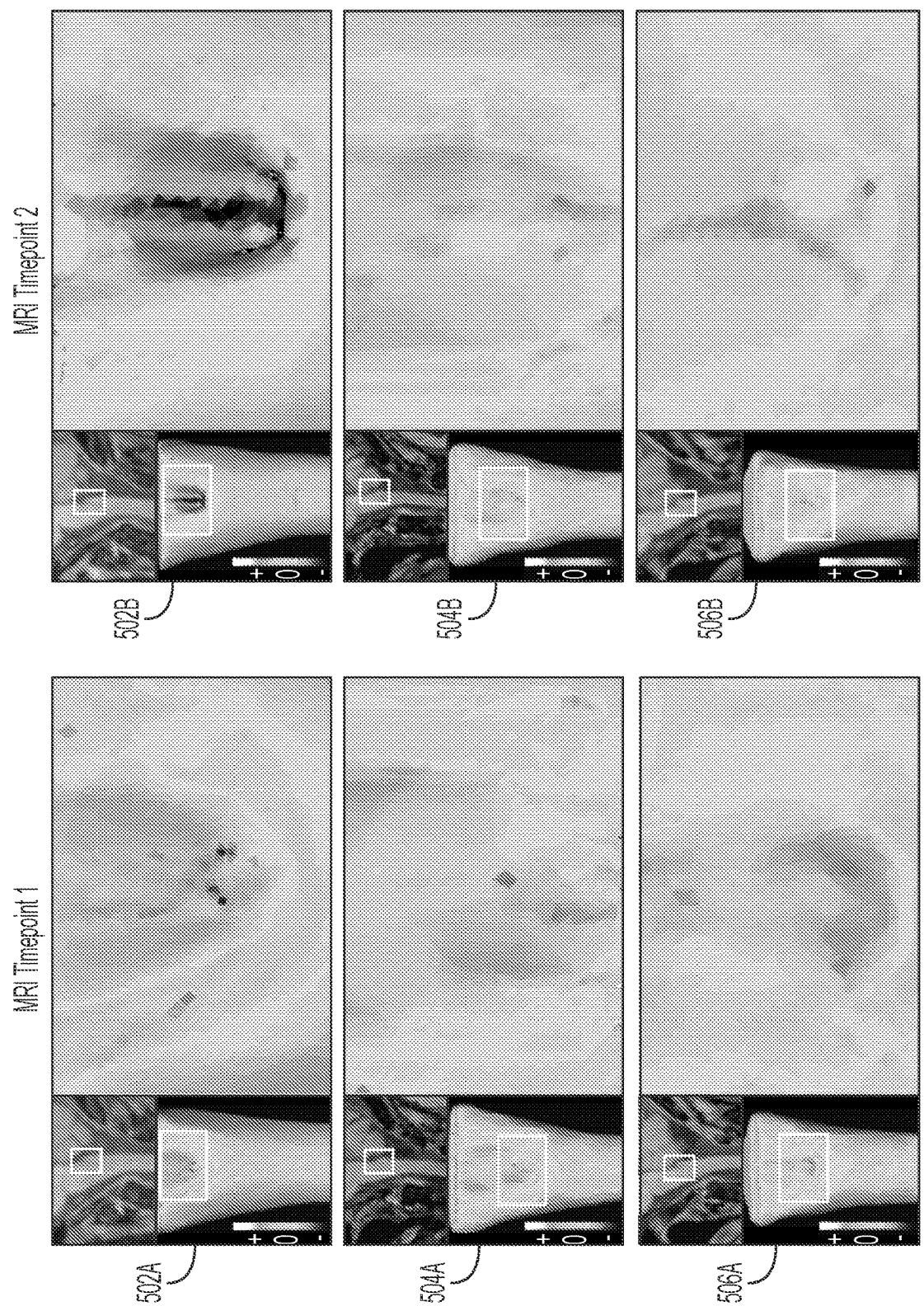
FIG. 5 illustrates an exemplary visual model of a region of interest studied in Example 1 according to various embodiments of the present disclosure.
Figure 6:
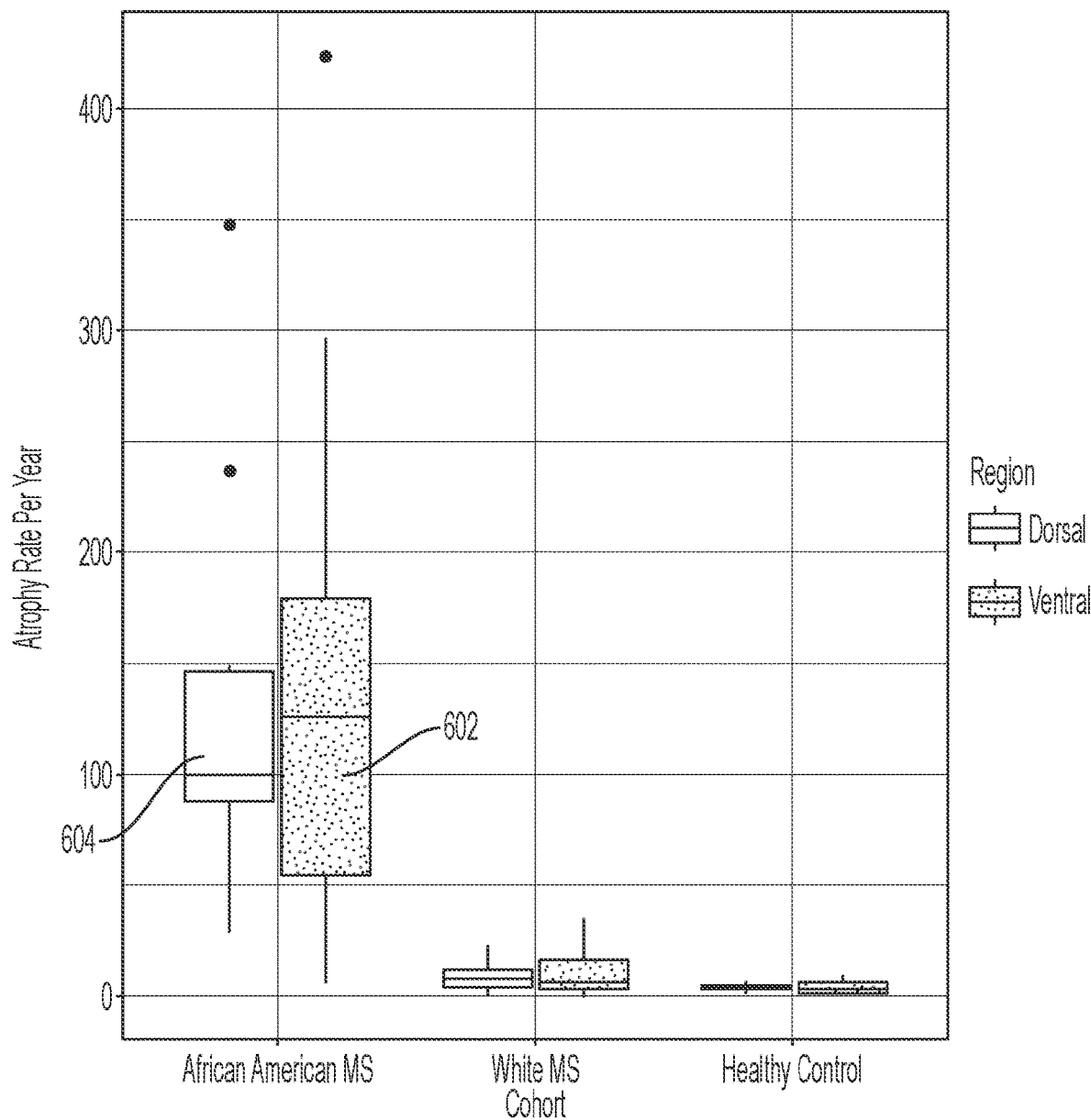
FIG. 6 illustrates a boxplot of atrophy rate per year for the groups studied in Example 1 according to various embodiments of the present disclosure.

The atrophy rate per year of the AA, white, and healthy patients is shown in FIG. 6. As shown, A significant atrophy rate was observed when comparing African American to whites with MS in the ventral (p<0.001) (602) and dorsal (p<0.001) (604) compartments. In AA MS patients, no significant difference was observed in the rate of change between the ventral and dorsal compartments yielding a p value=0.69. This may change, however, when a larger set of patients are studied. The volume change observed in the dorsal compartment may be driven by selective vulnerability of distinct areas/structures (i.e. the findings presented in FIG. 5) rather than being diffusely affected.

No significant differences in surface complexity were identified when each of the 6 sides of a selected 8 mm×6.25 mm×9 mm region at the ventral aspect of the medulla-upper cervical spinal cord between AA and white MS patients was examined and when MS patients were compared to healthy control subjects. All of the 6 sides were used for the surface texture measure, which involved quantifying curvature both externally and internally from the region of interest. One of the six sides provide data for the external surface. The other five sides provide curvature values from anatomical structures internally. However, significant differences at the dorsal region were observed between racial groups at MRI time points 1 (p=0.03) and 2 (p=0.047) when evaluating the rate of change between MRI studies (p<0.0001) with the region of interest evolving to a more concave shape over time in the AA MS group.

Figure 8:
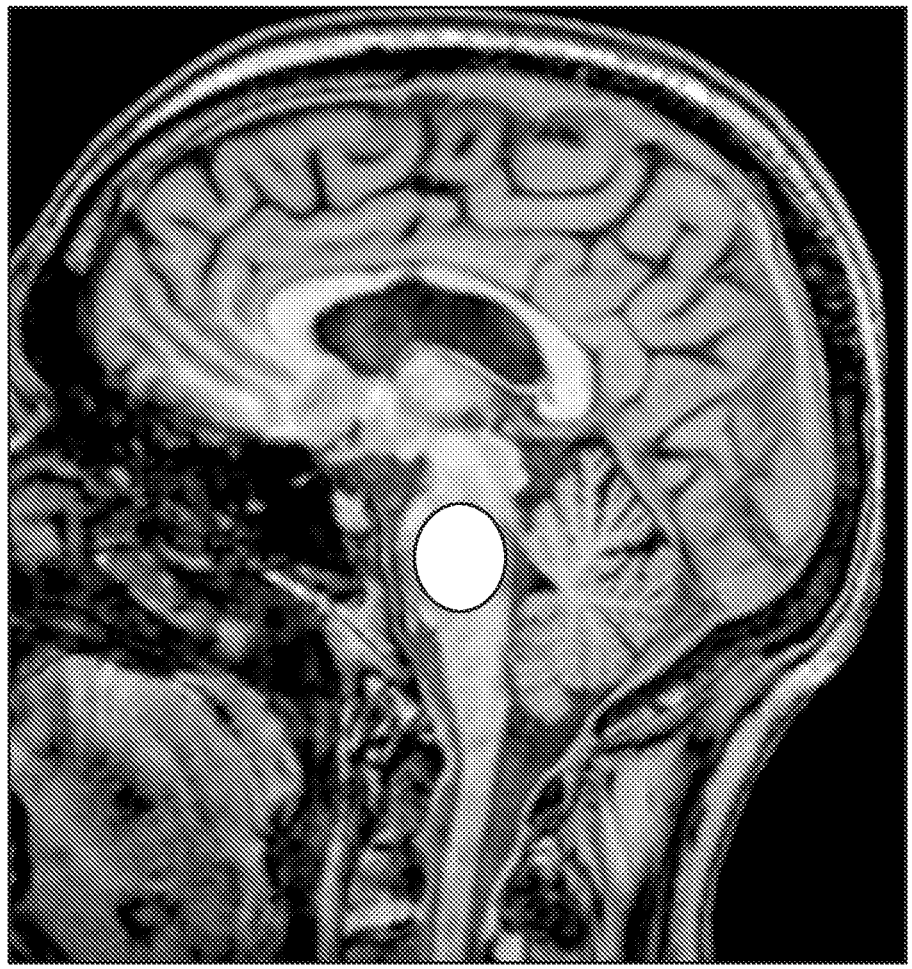
FIG. 8 illustrates an exemplary visual model of a region of interest studied in Example 1 according to various embodiments of the present disclosure

The differences in the dorsal regions are shown in FIG. 5. FIG. 5 illustrates visual models of the medulla-upper cervical spinal cord for an AA patient (502A, 502B), a white patient (504A, 504B), and a healthy patient (506A, 506B) at the first and second time points. As shown, the models demonstrate the change in surface texture between time points in the selected region enclosed by the white box 508. Three-dimensional (3D) MRI sagittal FLAIR images illustrate the posterior region corresponding to the visual model indicated in the white box 508. The darker the blue or more negative the value, the greater degree of concavity, whereas colors closer to red correspond to or more positive values that indicate a greater degree of convexity. For the AA patient, the significant difference in the darkness of the blue in the model at time point 2 502B is significantly darker compared to the model at time point 1 (502A). For the white and healthy patients only a minimal change the darkness of the blue is observed between the models at time point 1 (504A, 506A) and the models at time point 2 (504B, 506B). A person of ordinary skill in the art would appreciate that other shapes, besides a box, can also be used for the texture analysis. As such, FIG. 8 illustrates an example with an ovoid shape with the region of interest being fully embedded in the brainstem. Of course, the region of interest can be partially embedded where 1 of the 6 sides represent the external surface and 5 of the 6 sides provide measures internally, as previously described.

The findings of Example 1 indicate distinct structural changes in select regions of the CNS, in the absence of clinical relapses. The ventral compartment studied here, comprising the medullary pyramids and cortical spinal tracts, medial lemniscus, and inferior olivary nucleus are responsible for cerebellar motor learning and functioning, demonstrated a greater rate of atrophy in AA versus white MS patients. Similar findings were also observed within the dorsal compartment containing a higher volume of white matter. Additionally, lower rates of tissue compliance, supported by the observation of more stable rates of 3D structure from MRI time point 1 to MRI time point 2 within the ventral and dorsal compartments were observed.

The results of Example 1 suggest shape and surface texture transitions in 3D may allow for the determination of meaningful characteristics that inform on fundamental mechanisms related to neurodegenerative changes that extend beyond our currently applied clinical imaging approaches, providing additional data beyond the resolution of the human eye. The analytical approach described herein is efficient and may be adapted to any existing 3D imaging technique. In particular, Example 1 required the acquisition of MRI data from a sequence less than 5-minutes in duration and required minimal post-processing. The metrics and or temporal change metrics may be generated using a near fully automated process that may be included with conventional clinical MRI data once validated. Additionally, the analytical method may be used to analyze any selection a CNS structure. For example, a portion of a CNS structure that is highly associated with clinical outcomes and is easily isolated uniformly across a variety of patients.

The results of Example 1 demonstrate that focal rather than global tissue changes occur in AA as compared to whites suggesting that certain anatomical regions may be more vulnerable to changes that may be reflective of early neurodegeneration in MS. The data and findings generated in this study may be used to inform on disease activity beyond observed multi-focal areas of inflammation by, for example, revealing characteristics having therapeutic implications and the need for a transition in treatment in the absence of clinical events. The techniques described herein may also be used in the study of emerging reparative or neuroprotective agents in the field of neuroimmunology. 3D conformational analysis may improve upon identifying factors that may be amenable to therapeutic targeting and help create a delivery of care that is more individualized to the patient.

Example 2

To examine whether longitudinal changes in volume, surface area, 3-dimensional (3D) displacement (i.e. change in lesion position), and 3D deformation (i.e. change in lesion shape) could inform on the origin of supratentorial brain lesions, 23 patients with MS and 11 patients with small vessel disease (SVD) are enrolled to perform standardized 3-T 3D brain MRI studies. Bayesian linear mixed effects regression models can be constructed to evaluate associations between changes in lesion morphology and disease state. A total of 248 MS and 157 SVD lesions are studied. Individual MS lesions may demonstrate significant decreases in volume<3.75 mm3 (p=0.04), greater shifts in 3D displacement by 23.4% with increasing duration between MRI time points (p=0.007), and greater transitions to a more non-spherical shape (p<0.0001). If 62.2% of lesions within a given MRI study had a calculated theoretical radius>2.49 based on deviation from a perfect 3D sphere, a 92.7% in-sample and 91.2% out-of-sample accuracy can be identified for the diagnosis of MS. Longitudinal 3D shape evolution and displacement characteristics may improve lesion classification, adding to MRI techniques aimed at improving lesion specificity.

Central to the diagnosis are magnetic resonance imaging (MRI) features and T2-hyperintensities highly suggestive of inflammatory demyelination based on lesion size and location. However, white matter anomalies resulting from microvascular disease, migraine headache, and normal aging, a general category known as cerebral small vessel disease (SVD) may be misinterpreted as representing the "classic" MRI features of MS, resulting in misdiagnosis. The introduction of novel imaging metrics enabled the visual appreciation of central venous vasculature within lesions or the identification of hypointense rims, improving the specificity of lesions related to MS.

The study cohort was comprised of 34 patients, 23 with MS (female: 14 (60.9%); mean age (standard deviation): 42.4 years (11.9 years), having a median disease duration of 1.99 years (25th-75th percentile: 0.54, 5.94 years)) and 11 with SVD (female: 11 (100%); 52.5 years (7.63 years)) yielding 405 lesions for study. Of the 11 SVD patients, chronic migraine headache history was present in 7 with the remaining 4 patients having an established diagnosis of hypertension. A total of 248 MS lesions and 157 SVD lesions were included in the analysis. Of the 23 MS patients studied, 18 were exposed to FDA approved disease modifying therapies (alemtuzumab: 1, dimethyl fumarate: 8, fingolimod: 2, glatiramer acetate: 1, natalizumab: 3, ocrelizumab: 2, teriflunomide: 1) with a median treatment exposure of 3.13 years (range: 0.30-15.39). Clinical relapses related to acute demyelinating events occurring within 90 days of MRI time points 1 and 2 were not observed in the MS group. The baseline demographic information, clinical characteristics of the groups studied, and lesion-level data by group are summarized within Table 3, shown below.

|  | Multiple sclerosis | Small vessel disease |
|---|---|---|
| Clinical data | | |
| Patients (n) | 23 | 11 |
| Age | | |
| Mean (standard deviation) | 42.4 years (11.9) | 52.5 years (7.63) |
| Female (%) | 14 (60.9) | 11 (100) |
| Race (%) | | |
| White | 21 (91.3) | 10 (90.9) |
| African American | 2 (8.7) | 0 (0) |
| Asian | 0 (0) | 2 (9.1) |
| Hispanic (%) | 2 (8.7) | 2 (18.2) |
| Disease duration | | |
| Median ($P_{25}$, $P_{75}$) | 1.99 years (0.54, 5.94) | — |
| Median Lesion Number ($P_{25}$, $P_{75}$) | 11 (6.5, 14.5) | 14 (12, 17) |
| Lesion-level data | | |
| Lesions analyzed (n) | 248 | 157 |
| Duration between MRI studies | | |
| Median ($P_{25}$, $P_{75}$) | 1.65 years (1.26, 1.91) | 2.74 years (1.72, 3.46) |
| Change in volume between MRI time points | | |
| Median ($P_{25}$, $P_{75}$) | −2.32 mm$^3$ (−9.67, 3.48) | 3.94 mm$^3$ (−0.65, 10.1) |
| Change in surface area between MRI time points | | |
| Median ($P_{25}$, $P_{75}$) | −2.16 mm$^2$ (−8.19, 3.51) | 4.18 mm$^2$ (−0.63, 8.93) |
| Theoretical Radius MRI Time Point 1 ($R_{ij1}$) | | |
| Median (($R_{ij1}$ − 1) × 100) ($P_{25}$, $P_{75}$) | 3.38 (2.41, 4.63) | 2.17 (1.54, 2.81) |
| Theoretical Radius MRI Time Point 2 ($R_{ij2}$) | | |
| Median (($R_{ij2}$ − 1) × 100) ($P_{25}$, $P_{75}$) | 3.46 (2.48, 4.60) | 2.10 (1.52, 3.06) |
| Displacement | | |
| Median ($P_{25}$, $P_{75}$) | 0.39 mm (0.28, 0.56) | 0.32 mm (0.22, 0.42) |

Inclusion criteria were comprised of (1) male or female patients≥18 years of age with either (2) an established diagnosis of relapsing—remitting MS following a comprehensive medical evaluation by fellowship trained MS specialists without history of migraine, use of recreational substances, or significant vascular risk factors, (3) absence of an acute neurological exacerbation related to CNS demyelination 30 days prior to the first MRI study and within the time interval between MRI time points, (4) lack of exposure to oral or intravenous glucocorticosteroid treatment 30 days prior to the first MRI study and no exposure during the time interval between scans, (5) no change in treatment assignment within 90 days prior to the first MRI and in the interval between MRI time points, or 6) confirmed non-MS patients with a history of migraine headaches or small vessel disease risk fac-tors with focal brain MRI white matter abnormalities present within the bilateral supratentorial white matter. Exclusion criteria included (1) female patients who were pregnant or lactating, (2) severe claustrophobia, and (3) reduced quality of MRI data limiting the 3D image processing.

Recruited patients were placed into two groups: (1) patients with a confirmed diagnosis of MS based on established criterial, results from supporting para-clinical studies (i.e. cerebrospinal fluid profiles, electrophysiological data, serological results) and the exclusion of other disease states, and (2) patients with a history of brain anomalies atypical for inflammatory demyelination based on the observed radiological phenotype and formal imaging interpretations by board certified neuroradiologists and clinical impressions by specialists in MS. Conclusions were further supported by negative laboratory, genetic, or other para-clinical studies to identify a clear underlying etiology.

In an example embodiment, for lesion segmentation, analyses were implemented without knowledge of clinical history, current or past treatments, or disease duration. MRI studies from the two time points were initially registered based on anatomical positioning and intensity using known techniques. MRI studies were aligned using a modified version of ITK as previously described. After positional and local intensity alignment, segmentations on selected focal supratentorial brain lesions measuring≥3 mm² that were verified from simultaneously viewed 3D high-resolution FLAIR and T2-weighted sequences were performed by implementing geodesic active contouring methodology with manual editing. Quality assurance assessments were also performed to ensure the accuracy of lesion segmentations. Quantitative data analyses including volume, sur-face area, displacement, and deformation calculations were then performed using Med-IP on individual and registered image files from both MRI time points.

In an example embodiment, for each lesion segmented at each MRI time point, lesion volume and surface area measurements were calculated. Changes in lesion volume and surface area over time were also determined. At the individual lesion level, a reduction in lesion volume below 3.75 mm3 between MRI time points was observed in the MS cohort as compared to the SVD cohort (95% Credible Interval (CrI)=(−7.60,−0.12), Bayesian p value=0.04). Although not statistically significant, we observed that the volume change between time points in the SVD cohort was largely positive (95% CrI=(−0.34, 5.18), Bayesian p value=0.08) while the volume change between time points in the MS cohort was largely negative (95% CrI=(−3.55, 0.71), Bayesian p value=0.18), controlling for age, volume of the given lesion at baseline, and duration between MRI studies. Regarding change in surface area between MRI time points, a significant difference was not observed between the two groups (95% CrI=(−7.08, 0.46), Bayesian p value=0.09). Positive surface area changes in the SVD group (95% CrI=(−0.56, 5.18), Bayesian p value=0.12) and negative changes in the MS cohort (95% CrI=(−3.03, 1.13), p=0.34) that did not reach statistical significance were identified after controlling for age, surface area of the given lesion at baseline, and duration between MRI studies.

In an example embodiment, three-dimensional image analysis was used to compute a metric defined as displacement which quantified changes in the space occupied by a given lesion between the two time points. For each lesion at each time point, a multitude of points were designated on the lesion surface at the first time point and their displacement at the second time point computed. As the number of points designated on the lesion surface is dependent upon lesion size, a range from 18 points to 2620 points in our dataset was observed. Due to the differing number of points between lesions and the desire to simplify the analysis from a multi-variate problem with lesion-specific dimensionality to a univariate problem, the median displacement was computed for each lesion. Furthermore, the median displacement was log-transformed to obtain a suitable model fit.

Figure 9:
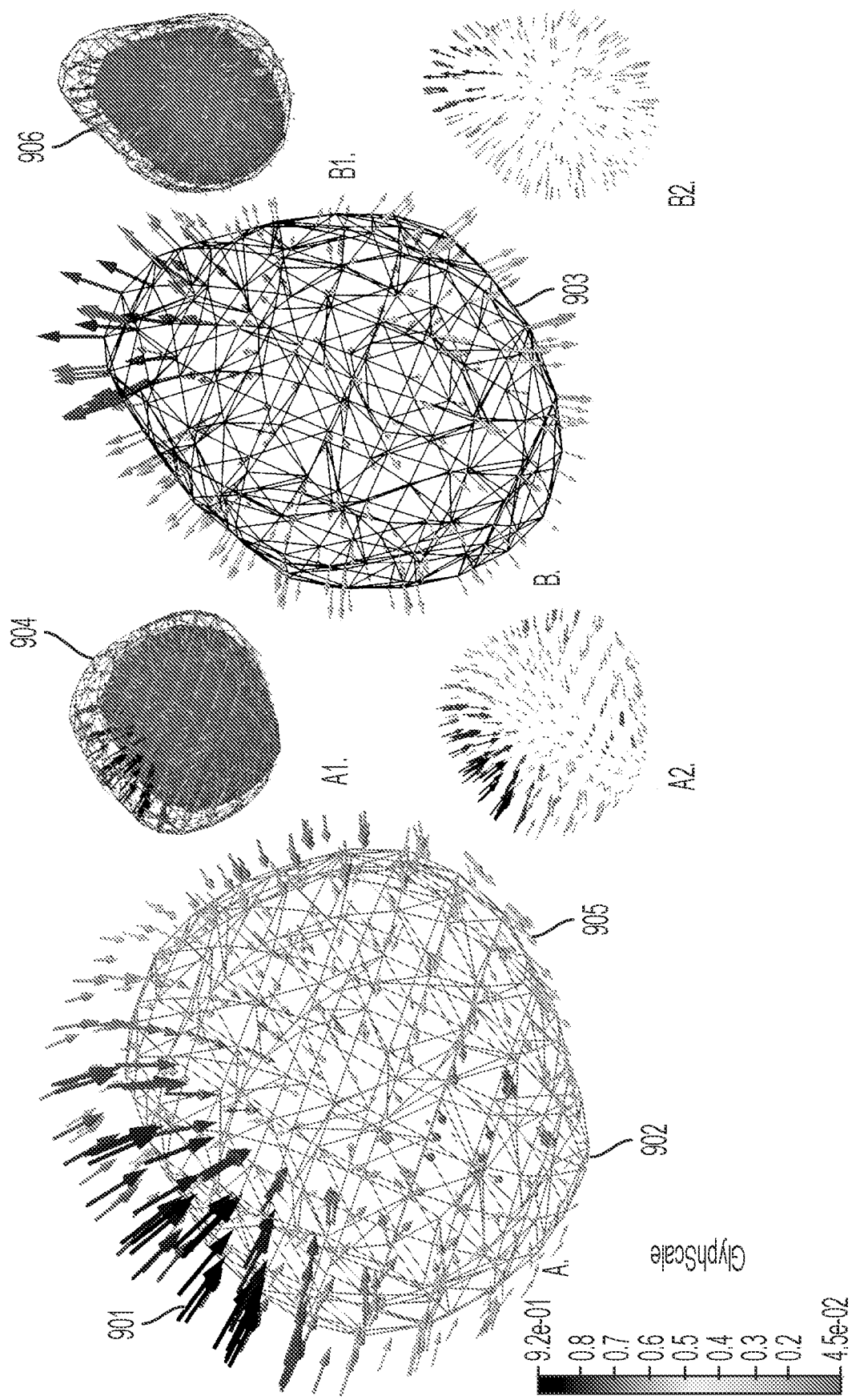
FIG. 9 illustrates a three-dimensional (3D) displacement vectors from a MS and SVD lesion studied in Example 2 according to various embodiments of the present disclosure.

FIG. 9 shows three-dimensional (3D) displacement vectors from a (A) MS and (B) SVD lesion both the magnitude (901 indicating a higher degree of displacement) and direction (positioning of arrows) of the displacement. 902 and 903 meshes represent the lesion morphology at MRI time points 2 and 1, respectively. The asymmetric displacement inward from time point 1 (A1, mesh 904) as indicated by mixed directional vectors along with greater differences in the magnitude of change may lead to the resulting 3D shape at time point 2 for the MS lesion (A1, 905, A2). Compare to the SVD lesion with more uniform directional vectors outward from the original lesion acquired at time point 1 (B). B1 shows mesh 906 demonstrating evolution in lesion size and relative preservation of the original shape at MRI time point 2. B2 shows displacement vectors from the SVD lesion that have more uniform degree of change in magnitude and direction as compared to the MS lesion.

Figure 10:
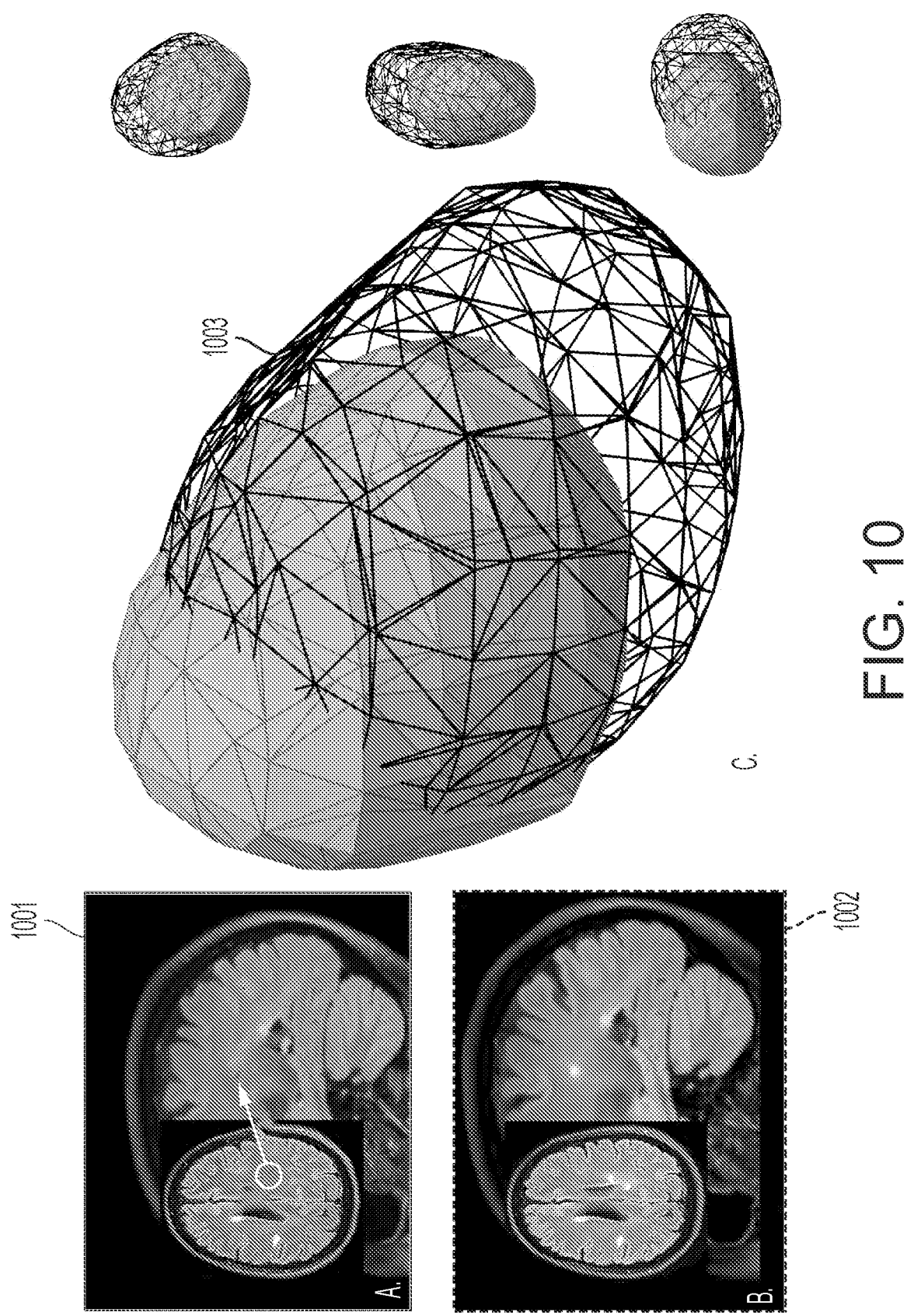
FIG. 10 illustrates two-dimensional (2D) MRI axial FLAIR and 3D sagittal FLAIR images highlighting a single MS lesion studied in Example 2 according to various embodiments of the present disclosure.

FIG. 10 shows two-dimensional (2D) MRI axial FLAIR and 3-dimensional (3D) sagittal FLAIR images highlighting a single MS lesion (circled 1001) from a 49-year-old white woman with relapsing remitting disease from (A) time point 1 and (B) time point 2 (1-year follow-up). Visual model (C) in 3D demonstrates displacement and deformation of the lesion at time point 2 (1002) compared to the original position at time point 1 (1003 mesh) shows the reduction in size and positioning of the lesion between time points that is not apparent on review of the longitudinal 2D MRI data (A,B).

The estimated median displacement for the SVD and MS cohorts for an average age patient with an average duration between scans and average surface area at baseline was 0.30 mm (95% CrI=(0.23, 0.40), Bayesian p value<0.0001) and 0.40 mm (95% CrI=(0.34, 0.47), Bayesian p value<0.001), respectively. Both of these findings revealed transitions in lesion displacement greater than 0 between MRI time points. A significant difference in the average log of the median displacement was not observed between groups (95% CrI=(−0.06, 0.62), Bayesian p value=0.10). However, as the difference between the two MRI time points increases by one standard deviation, the log of the median displacement increases by 0.21 mm (95% CrI=(0.05, 0.36), Bayesian p value=0.007), suggesting greater shifts in the location of a lesion at the second MRI time point by 23.4% (95% CrI=5.59%, 43.5%), as compared to the original position shown in FIG. 10.

Based on previously observed 3D renderings of lesions from MS patients, SVD lesions exhibited a more spherical shape relative to MS lesions. Therefore, a metric was developed which informs on the resemblance of a lesion to a sphere based on the previously computed volume and surface area. For a sphere with radius r, volume=$4\pi r^3/3$ and surface area=$4\pi r^2$. Moreover, the radius can be computed as a function of volume, as shown in equation 1:

$$r^{Vol}=\sqrt[3]{0.75 \cdot \text{Volume}/\pi},$$

or as a function of the surface area, as shown in equation 2:

$$r^{SA}=\sqrt{0.25 \cdot \text{SurfaceArea}/\pi}.$$

If a given lesion is a sphere, $r^{Vol}=r^{SA}$, or $r^{SA}/r^{Vol}=1$. Furthermore, given that the ratio of surface area to volume is minimized for a sphere and becomes greater for more complex shapes, computing the $r^{Vol}$ and $r^{SA}$ based on Eqs. (1) and (2) for any 3D shape, then $R=r^{SA}/r^{Vol} \geq 1$, with values of R>1 indicating greater deviations from a spherical shape. This metric can be defined as deformation relative to a sphere, or simply deformation.

$R_{ijt}$ denotes the value of R for the i-th patient with j-th lesion at time point t, t=1, 2. A classification algorithm was developed in which a threshold for R and threshold for the proportion of lesions from a given patient greater than the threshold for R were estimated based on area under the receiver operating characteristic curve. Leave-one-out cross-validation was performed to assess the predictive ability of the proposed classification algorithm. Both time points for each subject were used in the classification algorithm. The classification algorithm was trained using 2× n−1 patients (training sample) that predicted not only the sample used to train the algorithm, but also the "testing sample" represented by 1 patient left out at each iteration. The average accuracy of the training sample predictions (i.e., in-sample accuracy) and testing sample prediction (i.e., out-of-sample accuracy) were also determined.

In an example embodiment, based on the analysis of R at time point 1, Rij 1, the data suggest that the posterior mean of (Rij 1 1)×100 for an average age SVD and MS patient with an average surface area at baseline was 2.55 (95% CrI=2.24, 2.90) and 3.17 (95% CrI=2.89, 3.48), respectively. Therefore, a 24.6% greater deformation for the MS cohort relative to the SVD cohort was observed (95% CrI=(5.01%, 47.4%), Bayesian p value=0.01). These results indicate a more spherical shape in the SVD cohort at MRI time point 1 relative to the MS cohort. Furthermore, for a lesion of average age with and average surface area at baseline, as the interval time between MRI studies increased by one year, the value of ((Rij2 1)×100) did not significantly change relative to ((Rij1 1)×100), indicating stability of the shape descriptor over time (95% CrI=(−0.01, 0.22), Bayesian p value=0.08). However, a significant decrease of 0.36 (95% CrI=(−0.48,−0.24), Bayesian p value<0.0001) in spherical shape was observed for MS lesions, indicating instability of the shape descriptor over time. That is, the value of ((Rij2 1)×100) decreased by 14.8% more than that of a SVD patient (95% CrI=(−20.5%,−8.87%), Bayesian p value<0.0001). Therefore, lesions from SVD maintained a more spherical shape from the two MRI time points In an example embodiment, Bayesian linear (or generalized linear) mixed effects models were used to model the differences in the 3D morphology metrics between the MS and SVD cohort, controlling for age and time between MRIs. Additionally, in the analysis of volume change over time, a covariate was also included to account for volume at baseline. Similarly, in the analysis of surface area change, displacement, and deformation, a covariate was also included to account for surface area at baseline. Surface area was chosen as a covariate in the models for displacement and deformation, instead of volume, given a greater correlation between surface area and displacement or deformation. Mixed effects models were implemented to capture intra-subject and, if applicable, intra-lesion correlation. Because of the limited amount of prior data in-volving similar work, weakly informative prior distributions were used for all models.

Bayesian analysis was performed using RStan in R. In order to ensure convergence within the model, 3 chains using 15,000 iterations with a 5000 iteration burn-in were run. Convergence was examined using the trace plots of parameters in the model. Once convergence to a stationary distribution was verified, the model was run with a single chain containing 15,000 iterations with a 5000-iteration burn-in. Distributional assumptions for the response were assessed by plotting the sorted posterior mean of the residuals against the mean of the ordered posterior predictive residuals. A plot of the posterior mean of the residuals versus the posterior mean of the fitted values was generated to examine the homogeneity of variance assumptions for models assuming normal or Student's t-distributed errors. Lastly, a plot of the prediction error generated based on the posterior predictive distribution versus the observed values of the response was generated. A two-sided Bayesian p value was computed and a p value<0.05 was considered significant for all statistical tests. The posterior mean of the parameters-of-interests were presented as the estimate of the parameter values, along with the credible interval.

Figure 11:
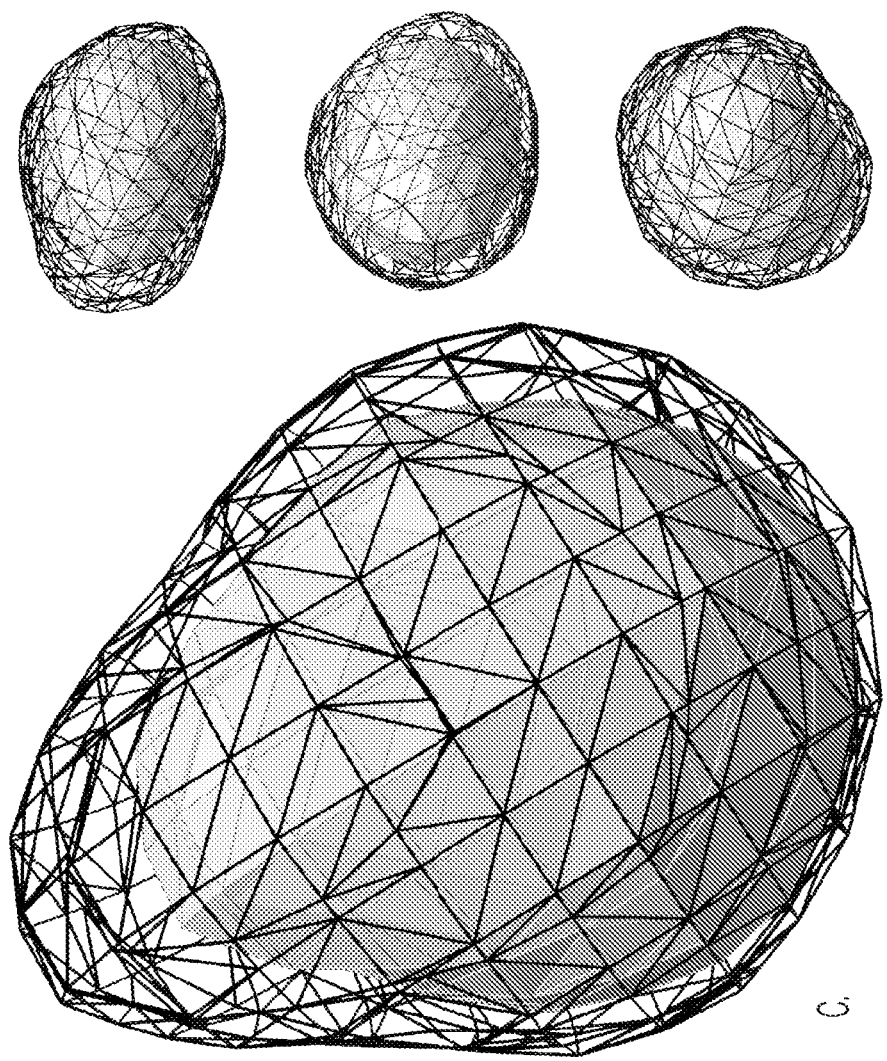
FIG. 11 illustrates 2D MRI axial FLAIR brain images highlighting a single SVD lesion studied in Example 2 according to various embodiments of the present disclosure.
Figure 11:
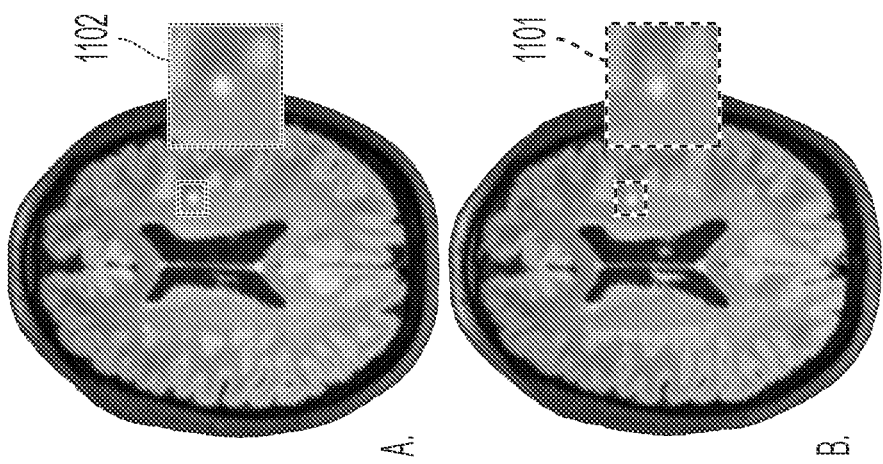

FIG. 11 shows two-dimensional (2D) MRI axial FLAIR brain images highlighting a single SVD lesion from a 42-year-old white woman from (A) time point 1 and (B) time point 2 (1-year follow-up). Visual simulation model in 3D demonstrating displacement and deformation of the lesion at time point 2 (1101) compared to the original position at time point 1 (1102). (C) Note the symmetric and more uniform growth between time points in the simulation model that is not apparent when comparing high-resolution MRI data at 3-Tesla (A,B).

A follow-up analysis was performed to determine if a threshold could be defined, in connection with Rijt, to accurately classify MS versus SVD lesions. For the training model, a 92.7% in-sample accuracy and 91.2% out-of-sample accuracy was obtained if greater than 62.2% of the lesions within a given MRI study had a ((Rij1 1)×100) value of >2.49. These findings were consistent between both MRI time points 1 and 2 from MS and SVD patients in the validation studies with an in-sample and out-of-sample accuracy of 91.2% and 91.4%, respectively, at time point 1 and 91.2% and 94.3%, respectively, at time point 2.

In an example embodiment, within the two MRI time points studied, MS and SVD lesions can be identified that evolve significantly in three domains: volume, displacement or lesion position changes from origin, and shape consistency. The method of studying how lesions evolve through defining morphological and spatial patterns of change may provide an alternative approach towards determining the etiology of brain white matter anomalies. A significant reduction in volume and a reduction in surface area trending towards significance in MS lesions was identified. Lesions resulting from SVD were found to be less dynamic with no significant changes observed in these measures. The reduction in volume for MS lesions was consistent with previous observations of sustained "radiological contraction" in all lesions at an average rate of 4.5% annually over a mean study period of 16 years. The finding of a volume contraction was independent of the time interval between MRI studies indicating an early recognition of lesion changes between longitudinal MRI studies that may better indicate insights into cause. The observation of more modest surface area differences between MRI time points may be related to the more dynamic shapes associated with MS lesions, lesion age, or a combination of these factors.

Beyond size and surface area metrics, a significantly higher degree of displacement or distance deviation in lesion position from the origin in MS lesions was identified when directly compared to SVD lesion transitions using a method employing 3D visual model data. The more dynamic transitions observed may relate to physiological differences between the two lesion types with MS lesions being associated with greater imbalances in energy demand and supply with impaired mitochondrial energy production impacting ion homeostasis, metabolic derangements with increased venous blood oxygenation compared to surrounding tissue, inflammatory expansion, and active remodeling or degenerative responses following injury.

MS lesions may have a greater tendency to be asymmetric with complex surface features as compared to those resulting from SVD. Given this data, different patterns in lesion deformation or shape transformations may exist between these two groups. By comparing the change between MRI time points to a reference shape, MS lesions demonstrated 34% greater deformation from a sphere relative to SVD lesions and a classification algorithm demonstrated robust accuracy rates in differentiating between these two lesion types when applied. The more spherical deformations observed with SVD, along with the lack of changes in lesion positioning, may point to the underlying pathophysiology of lesion development as hyaline degeneration of the subcortical arteries and arterioles along with resulting micro-ischemia, gliosis, and tissue degeneration dominate. Alterations in endothelial shear stress, decreased vessel wall compliance, impaired vasodilation, changes in vessel thickness, perivascular enlargement, and amyloid B peptide within vessels have also been implicated. These mechanisms of injury may differ substantially with chronic autoimmune demyelinating events where persistent inflammation related to aberrant microglia or macrophage behavior may occur along with endogenous remyelination and secondary degenerative changes. Collectively, these findings appear to be consistent with the lack of a shared mechanism for myelin injury that may result from a vascular or immune mediated process and may explain our observed difference in shape evolution.

Figure 12:
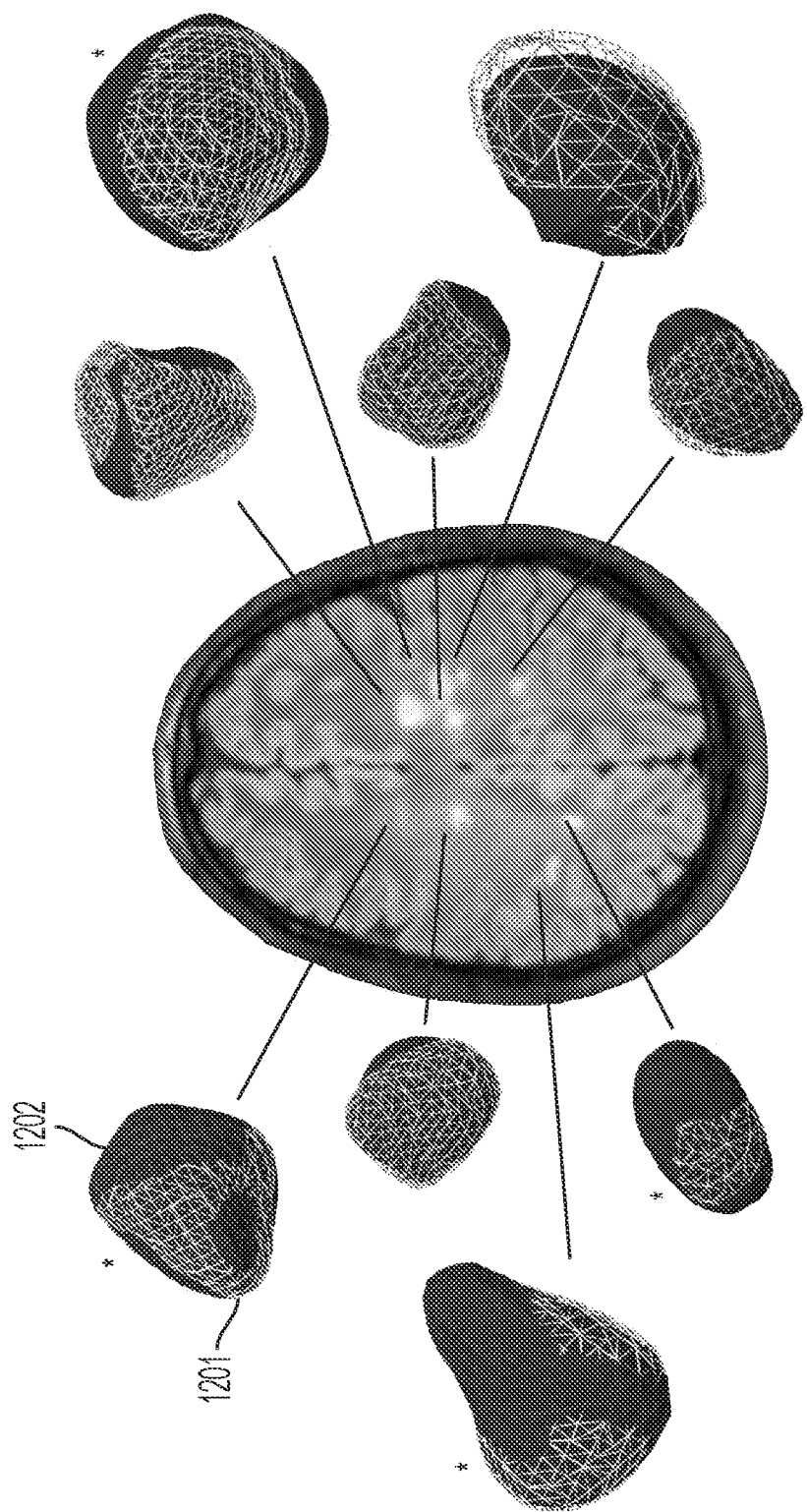
FIG. 12 illustrates 2D MRI axial FLAIR image from a patient with relapsing remitting MS with corresponding 3D simulated lesions studied in Example 2 according to various embodiments of the present disclosure.

FIG. 12 shows a two-dimensional (2D) MRI axial FLAIR image from a patient with relapsing remitting MS with corresponding 3-dimensional (3D) simulated lesions created from two MRI time points acquired approximately 1-year apart. The mesh 1201 represents the lesion in 3D at MRI time point 1 and solid 1202, representing the evolution of the lesion at MRI time point 2. The heterogeneity of the 3D transitions with all lesions demonstrates displacement and reductions or increases in lesion volume.

The study of the evolution of 3D lesion shape transitions may facilitate the understanding of lesion structure and MRI techniques to monitor disease by allowing for a determination of qualitative changes that are currently not discernable to the human eye when comparing MRI time points along with providing quantitative measures of variation. The approach may also reveal greater insights into disease activity by recognizing lesions prone to chronic active inflammation or 'smoldering' that are associated with clinical disability (FIG. 12) and have utility in situations where the diagnosis of inflammatory demyelination may be equivocal or suggestive of radiologically isolated syndrome (RIS).

Computer Hardware

Figure 7:
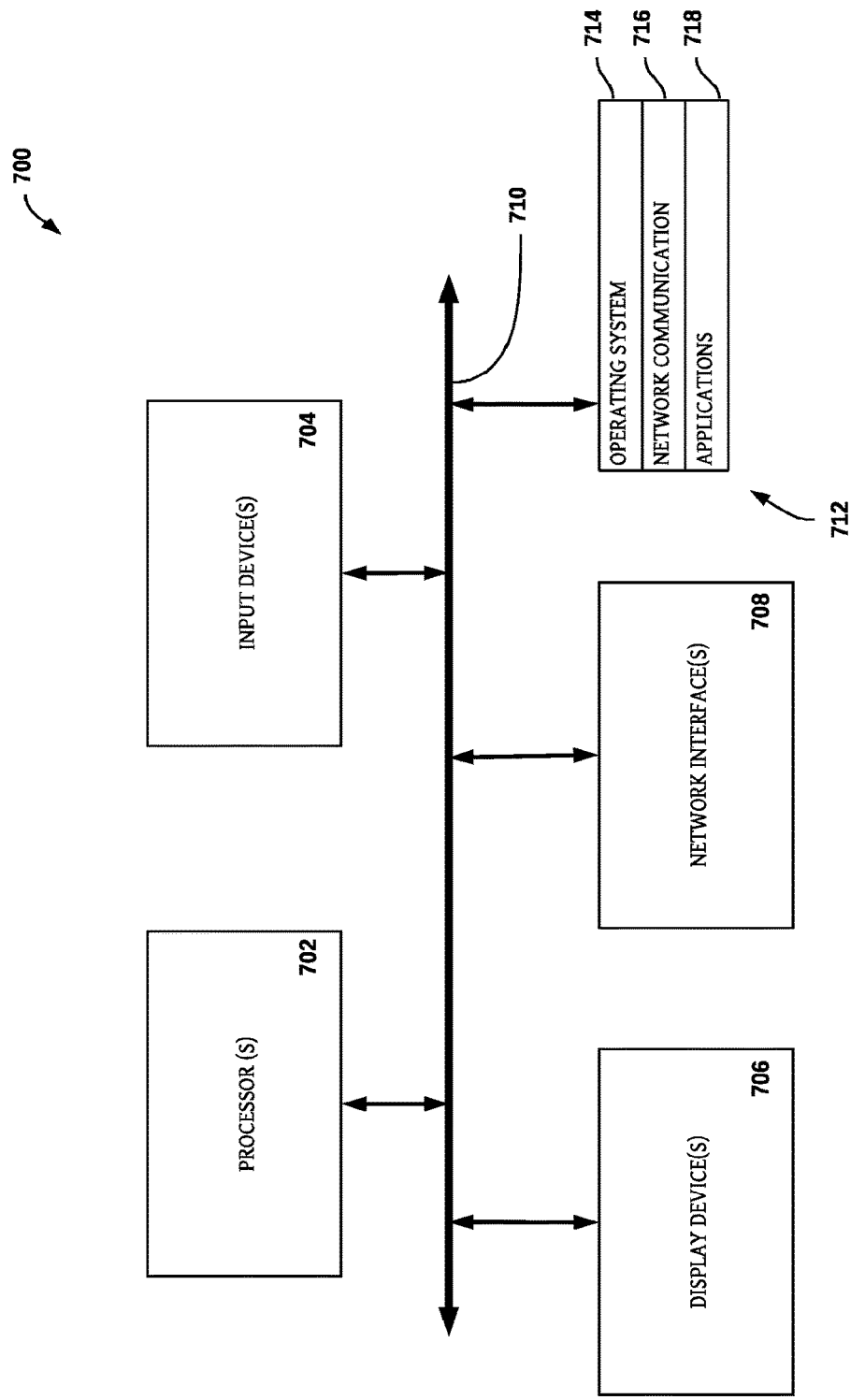
FIG. 7 is a block diagram illustrating an exemplary computer system for implementing the CNS 3D structure analysis system described herein according to various embodiments of the present disclosure.

FIG. 7 shows a computing device according to an embodiment of the present disclosure. For example, computing device 700 may function as client (which may include the CNS 3D structure analysis system 200). The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable mediums 712. Each of these components may be coupled by bus 710, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, camera, and touch-sensitive pad or display. Bus 710 may be any known internal or external bus technology, including but not limited to ISA, EISA, PCI, PCI Express, NuBus, USB, Serial ATA or FireWire. Computer-readable medium 712 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as TCP/IP, HTTP, Ethernet, telephony, etc.).

Application(s) 718 may be an application that uses or implements the processes described herein and/or other processes. For example, an 3D structure analysis application that calculates one or more metrics used to diagnose, track progression of, and predict a course of disease development based on the 3D structure of a portion of a CNS structure. The processes may also be implemented in operating system 714. For example, application 718 and/or operating system 714 may present GUIs that display one or more 3D representations and or metric calculated by the analysis system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, microcontrollers, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The present disclosure incorporates the following publications/articles by reference:

1. Thompson, A. J. et al. Diagnosis of multiple sclerosis: 2017 revisions of the McDonald criteria. Lancet Neurol. 17, 162-173 (2018).
2. Wardlaw, J. M., Smith, C. & Dichgans, M. Small vessel disease: mechanisms and clinical implications. Lancet Neurol. 18, 684-696 (2019).
3. Solomon, A. J., Naismith, R. T. & Cross, A. H. Misdiagnosis of multiple sclerosis: impact of the 2017 McDonald criteria on clinical practice. Neurology. 92, 26-33 (2019).
4. Sati, P. et al. The central vein sign and its clinical evaluation for the diagnosis of multiple sclerosis: a consensus statement from the North American Imaging in Multiple Sclerosis Cooperative. Nat. Rev. Neurol. 12, 714-722 (2016).
5. Hammond, K. E. et al. Quantitative in vivo magnetic resonance imaging of multiple sclerosis at 7 Tesla with sensitivity to iron. Ann. Neurol. 64, 707-713 (2008).
6. Solomon, A. J. et al. "Central vessel sign" on 3T FLAIR* MRI for the differentiation of multiple sclerosis from migraine. Ann. Clin. Transl. Neurol. 3, 82-87 (2016).
7. Sinnecker, T. et al. Evaluation of the central vein sign as a diagnostic imaging biomarker in multiple sclerosis. JAMA Neurol. 76, 1446-1456 (2019).
8. Absinta, M. et al. Identification of chronic active multiple sclerosis lesions on 3T MRI. AJNR Am. J. Neuroradiol. 39, 1233-1238 (2018).
9. Elliott, C. et al. Slowly expanding/evolving lesions as a magnetic resonance imaging marker of chronic active multiple sclerosis lesions. Mult. Scler. https://doi.org/10.1177/13524 58518 81411 7 (2018).
10. Frischer, J. M. et al. Clinical and pathological insights into the dynamic nature of the white matter multiple sclerosis plaque. Ann. Neurol. 78, 710-721 (2015).
11. Dal-Bianco, A. et al. Slow expansion of multiple sclerosis iron rim lesions: pathology and 7 T magnetic resonance imaging. Acta Neuropathol. 133, 25-42 (2017).
12. Absinta, M. et al. Association of chronic active multiple sclerosis lesions with disability in vivo. JAMA Neurol. 76, 1474-1483 (2019).
13. McFarland, H. F. et al. Using gadolinium-enhanced magnetic resonance imaging lesions to monitor disease activity in multiple sclerosis. Ann. Neurol. 32, 758-766 (1992).
14. Solomon, A. J. et al. The contemporary spectrum of multiple sclerosis misdiagnosis: a multicenter study. Neurology 87, 1393-1399 (2016).

15. Ziemssen, T. et al. Optimizing treatment success in multiple sclerosis. J. Neurol. 263, 1053-1065 (2016).
16. Sethi, V. et al. Slowly eroding lesions in multiple sclerosis. Mult. Scler. 23, 464-472 (2017).
17. Newton, B. D. et al. Three-dimensional shape and surface features distinguish multiple sclerosis lesions from nonspecific white matter disease. J. Neuroimaging 27, 613-619 (2017).
18. Sivakolundu, D. K. et al. Three-dimensional lesion phenotyping and physiologic characterization inform remyelination ability in multiple sclerosis. J. Neuroimaging 29, 605-614 (2019).
19. Dutta, R. et al. Mitochondrial dysfunction as a cause of axonal degeneration in multiple sclerosis patients. Ann. Neurol. 59, 478-489 (2006).
20. Trapp, B. D. & Stys, P. K. Virtual hypoxia and chronic necrosis of demyelinated axons in multiple sclerosis. Lancet Neurol. 8, 280-291 (2009).
21. Neuropathology Group. Medical Research Council Cognitive F and Aging S. Pathological correlates of late-onset dementia in a multicentre, community-based population in England and Wales. Neuropathology Group of the Medical Research Council Cognitive Function and Ageing Study (MRC CFAS). Lancet. 357, 169-175 (2001).
22. Hoogeveen, E. S. et al. MRI evaluation of the relationship between carotid artery endothelial shear stress and brain white matter lesions in migraine. J. Cereb. Blood Flow Metab. https://doi.org/10.1177/02716 78X19 85781 0 (2019).
23. Fernando, M. S. et al. White matter lesions in an unselected cohort of the elderly: molecular pathology suggests origin from chronic hypoperfusion injury. Stroke 37, 1391-1398 (2006).
24. van Veluw, S. J. et al. Different microvascular alterations underlie microbleeds and microinfarcts. Ann. Neurol. 86, 279-292 (2019).
25. Trapp, B. D. et al. Axonal transection in the lesions of multiple sclerosis. N. Engl. J. Med. 338, 278-285 (1998).
26. Chang, A., Tourtellotte, W. W., Rudick, R. & Trapp, B. D. Premyelinating oligodendrocytes in chronic lesions of multiple sclerosis. N. Engl. J. Med. 346, 165-173 (2002).
27. Brown, R. B., Traylor, M., Burgess, S., Sawcer, S. & Markus, H. S. Do cerebral small vessel disease and multiple sclerosis share common mechanisms of white matter injury?. Stroke https://doi.org/10.1161/STROK EAHA1 18023 649 (2019).
28. Elliott, C. et al. Chronic white matter lesion activity predicts clinical progression in primary progressive multiple sclerosis. Brain 142, 2787-2799 (2019).
29. Lebrun, C. et al. Unexpected multiple sclerosis: follow-up of 30 patients with magnetic resonance imaging and clinical conversion profile. J. Neurol. Neurosurg. Psychiatry 79, 195-198 (2008).
30. Okuda, D. T. et al. Incidental MRI anomalies suggestive of multiple sclerosis: the radiologically isolated syndrome. Neurology 72, 800-805 (2009).
31. Lebrun-Frenay, C. et al. Radiologically isolated syndrome: 10-year risk estimate of a clinical event. Ann. Neurol. https://doi.org/10.1002/ana.25799 (2020).
32. Hansen, M. R. et al. Post-gadolinium 3-dimensional spatial, surface, and structural characteristics of glioblastomas differentiate pseudoprogression from true tumor progression. J. Neurooncol. 139, 731-738 (2018).
33. Nyul, L. G., Udupa, J. K. & Zhang, X. New variants of a method of MRI scale standardization. IEEE Trans. Med. Imaging 19, 143-150 (2000).
34. Casettes, V., Kimmel, R. & Sapiro, G. Geodesic active contours. Int. J. Comput. Vision 22, 61-79 (1997).
35. Stan Development Team. RStan: the R interface to Stan. R package version 2.19.2. https://mc-stan.org/. (2019).
36. R Core Team. R: A language and environment for statistical computing. R Foundation for Statistical Computing, Vienna, Austria. https://www.R-project.org/. (2019).

The invention claimed is:

1. A method of analyzing a three-dimensional (3D) structure of a central nervous system (CNS) structure comprising:
    capturing, by a 3D imaging device, image data of a portion of the CNS structure of a patient at a first time point;
    accessing image data of the portion of the CNS structure of a patient at a second time point, wherein the second time point is after the first time point;
    generating, from the image data, a first 3D representation of the portion of the CNS structure at the first time point and a second 3D representation of the portion of the CNS structure at the second time point;
    calculating one or more metrics that describe at least one of a 3D structural property of the CNS structure at the first time point, a 3D structural property of the CNS structure at the second time point, and a change in the CNS structure between the first time point and the second time point;
    identifying one or more patterns of structural change in the CNS structure from the one or more metrics; and
    determining a probability of a particular course of development for a neurological condition of the patient based on the one or more patterns of structural change.

2. The method of claim 1, further comprising:
    segmenting the image data to extract a region of interest (ROI) of the CNS structure that is included in the image data; and
    aligning the first 3D representation and the second 3D representation using an intensity matching technique.

3. The method of claim 2, wherein the ROI is clinically relevant and uniformly repeatable across a wide variety of different patients with degenerative neurological conditions.

4. The method of claim 1, wherein the CNS structure is a portion of at least one of a brain and a spinal cord.

5. The method of claim 1, wherein the one or more metrics include at least one of a volume measurement, a surface area measurement, a displacement measurement, and a surface complexity measurement.

6. The method of claim 1, wherein the one or more metrics include a compliance metric that describes the change in a property of the CNS structure over time.

7. The method of claim 1, further comprising diagnosing a neurological condition or tracking the progress of the neurological condition based on at least one of the one or more metrics and the patterns of structural change.

8. The method of claim 1, wherein the determining a probability of a particular course of development for the neurological condition further comprises:
    comparing the one or more metrics to one or more thresholds; and
    determining the neurological condition is on a progressive course of development response to determining at least one metric exceeds the threshold for that metric.

9. The method of claim 8, wherein the one or more thresholds include:
    a volume-based threshold that is exceeded when a change in volume of the ROI of the CNS structure exceeds a threshold volume change;

an area-based threshold that is exceeded when a change in a surface area of the ROI of the CNS structure exceeds a threshold surface area change; and a surface complexity threshold that is exceeded when a change in the surface complexity of the ROI of the CNS structure exceeds a threshold surface complexity change.

10. The method of claim 9, wherein the value of at least one of the volume-based threshold, the area-based threshold, and the surface complexity threshold is specific to a race of the patient.

11. A system for analyzing the three-dimensional (3D) structure of a central nervous system (CNS) structure comprising:
   a 3D imaging device configured to capture image data of a portion of the CNS structure of a patient at a first time point; and
   an analytics module configured to cause one or more processors to perform the operations of:
      accessing image data of the portion of the CNS structure of a patient at a second time point, wherein the second time point is after the first time point;
      generating, from the image data, a first 3D representation of the portion of the CNS structure at the first time point and a second 3D representation of the portion of the CNS structure at the second time point;
      calculating one or more metrics that describe at least one of a 3D structural property of the CNS structure at the first time point, a 3D structural property of the CNS structure at the second time point, and a change in the CNS structure between the first time point and the second time point;
      identifying one or more patterns of structural change in the CNS structure form the one or more metrics; and
      determining a probability of a particular course of development for a neurological condition of the patient based on the one or more patterns of structural change.

12. The system of claim 11, wherein the analytics module is further configured to cause the processor to perform the operations of:
   segmenting the image data to extract a region of interest (ROI) of the CNS structure that is included in the image data; and
   aligning the first 3D representation and the second 3D representation using an intensity matching technique.

13. The system of claim 12, wherein the ROI is clinically relevant and uniformly repeatable across a wide variety of different patients with degenerative neurological conditions.

14. The system of claim 11, wherein the CNS structure is a portion of at least one of a brain and a spinal cord.

15. The system of claim 11, wherein the one or more metrics include at least one of a volume measurement, a surface area measurement, a displacement measurement, and a surface complexity measurement.

16. The system of claim 11, wherein the one or more metrics include a compliance metric that describes the change in a property of the CNS structure over time.

17. The system of claim 11, wherein the analytics module is further configured to cause the processor to perform the operations of:
   diagnosing a neurological condition or tracking the progress of the neurological condition based on at least one of the one or more metrics and the patterns of structural change.

18. The system of claim 11, wherein the analytics module is further configured to cause the processor to perform the determining a probability of a particular course of development for the neurological condition by:
   comparing the one or more metrics to one or more thresholds; and
   determining the neurological condition is on a progressive course of development in response to determining at least one metric exceeds the threshold for that metric.

19. The system of claim 11, wherein the one or more thresholds include:
   a volume-based threshold that is exceeded when a change in volume of a region of the CNS structure exceeds a threshold volume change;
   an area-based threshold that is exceeded when a change in a surface area of a region of the CNS structure exceeds a threshold surface area change; and
   a surface complexity threshold that is exceeded when a change in the surface complexity of a region of the CNS structure exceeds a threshold surface complexity change.

20. The system of claim 19, wherein the value of at least one of the volume-based threshold, the area-based threshold, and the surface complexity threshold is specific to a race of the patient.

* * * * *